United States Patent
Nilsen

(10) Patent No.: US 11,550,714 B2
(45) Date of Patent: Jan. 10, 2023

(54) COMPILING APPLICATION WITH MULTIPLE FUNCTION IMPLEMENTATIONS FOR GARBAGE COLLECTION

(71) Applicant: International Business Machines Corporation, Armonk, NY (US)

(72) Inventor: Kelvin D. Nilsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 16/384,529

(22) Filed: Apr. 15, 2019

(65) Prior Publication Data

US 2020/0327052 A1    Oct. 15, 2020

(51) Int. Cl.
*G06F 12/00* (2006.01)
*G06F 12/02* (2006.01)
*G06F 8/41* (2018.01)

(52) U.S. Cl.
CPC ........ *G06F 12/0269* (2013.01); *G06F 8/4434* (2013.01)

(58) Field of Classification Search
CPC ............................ G06F 8/4434; G06F 12/0269
USPC ....................................................... 707/813
See application file for complete search history.

(56) References Cited

U.S. PATENT DOCUMENTS

| | | | | |
|---|---|---|---|---|
| 6,529,919 B1* | 3/2003 | Agesen | ............... | G06F 9/44594 |
| 7,584,232 B2* | 9/2009 | Guo | ................... | G06F 12/0269 |
| 7,937,419 B2* | 5/2011 | Ylonen | ............... | G06F 12/0253 |
| | | | | 707/813 |
| 8,024,505 B2 | 9/2011 | Dahlstedt et al. | | |
| 8,046,544 B2* | 10/2011 | Click, Jr. | ............ | G06F 12/0269 |
| | | | | 711/159 |
| 8,566,368 B2 | 10/2013 | Massarenti | | |
| 8,713,066 B1 | 4/2014 | Lo et al. | | |
| 8,738,859 B2* | 5/2014 | Cher | ................... | G06F 12/0848 |
| | | | | 711/120 |
| 9,355,029 B2 | 5/2016 | Moser | | |
| 9,720,819 B2 | 8/2017 | Anderson | | |
| 9,767,019 B2 | 9/2017 | Flood | | |
| 10,061,696 B2 | 8/2018 | Jones et al. | | |
| 10,459,656 B1 | 10/2019 | Nilsen | | |
| 10,642,663 B2* | 5/2020 | Harris | ................... | G06F 11/301 |
| 2008/0281886 A1 | 11/2008 | Petrank et al. | | |
| 2015/0100752 A1 | 4/2015 | Flood | | |
| 2015/0277542 A1 | 10/2015 | Chinnakkonda Vidyapoornachary et al. | | |
| 2017/0177471 A1 | 6/2017 | Frazier et al. | | |
| 2020/0042223 A1 | 2/2020 | Li | | |

OTHER PUBLICATIONS

Schoeberl et al., "Nonblocking Real-Time Garbage Collection", 2010, ACM, 28 pages. (Year: 2010).*
Click et al., "The Pauseless GC Algorithm", 2005, ACM, pp. 46-56. (Year: 2005).*

(Continued)

*Primary Examiner* — Ted T. Vo
(74) *Attorney, Agent, or Firm* — Peter J. Edwards

(57) ABSTRACT

Functions of an application may include multiple implementations that have corresponding behaviors but perform different garbage collection-related activities such that the different implementations may be executed during different garbage collection phases to reduce overall garbage collection overhead during application execution.

18 Claims, 12 Drawing Sheets

(56) References Cited

OTHER PUBLICATIONS

Ossia et al., "A Parallel, Incremental and Concurrent GC for Servers", ACM, 2002, pp. 129-140. (Year: 2002).*
Luo, "Concurrent Scavenge Garbage Collection Policy", Mar. 2019, retrieved from Eclipse OpenJ9 Blog—https://blog.openj9.org/, 12 pages. (Year: 2019).*
Synonym.tech, "Corresponding behavior Synonyms", 2021, retrieved from https://synonym.tech/phrase/corresponding/behavior, 4 pages. (Year: 2021).*
Preda, S. Optimizing Memory Use in Java applications, garbage collectors. Database Systems Journal, 6(4), pp. 27-31. (2016).
Tene, G., Iyengar, B., & Wolf, M. C4: The continuously concurrent compacting collector. ACM SIGPLAN Notices, 46(11), pp. 79-99. (2011).
K. Nilsen, "Understanding the Role of Real-Time Java in Aegis Warship Modernization," IEEE Software Technology Conference, Salt Lake City, UT, Apr. 2013, 17 pages, Charts available at http://conferences.computer.org/stc/2013/papers/0001a044.pdf.
Nilsen, "Real-Time Java in Modernization of the Aegis Weapon System," Proceedings of the 2012 ACM Conference an High Integrity Language Technology, Dec. 2012, pp. 63-70.
Nilsen, "Placement Of Explicit Preemption Points Into Compiled Code," U.S. Appl. No. 16/282,807, filed Feb. 22, 2019.
Nettles et al., "Real-Time Replication Garbage Collection," Programming Language Design and Implementation, ACM SIGPLAN Notices, vol. 28, No. 6, Jun. 1993, 5 pages, https://doi.org/10.1145/173262.155111.
Nettles et al., "Replication-Based Incremental Copying Garbage Collection," Proceedings of the SIGPLAN International Workshop on Memory Management, 1992, 8 pages.
Nilsen, "Adding Real-Time Capabilities to Java," Communications of the ACM, vol. 41, No. 6, Jun. 1998, pp. 49-56.
Nilsen, "Improved Real-Time Replicating Garbage Collection," U.S. Appl. No. 16/368,253, filed Mar. 28, 2019.
Nilsen, "Hybrid Garbage Collection," U.S. Pat. No. 10,936,483, filed Apr. 15, 2019, Issued Feb. 10, 2021.

* cited by examiner

COMPILING APPLICATION WITH MULTIPLE FUNCTION IMPLEMENTATIONS FOR GARBAGE COLLECTION

BACKGROUND

Garbage collection generally refers to a process of identifying unused areas of main memory storage and reclaiming those areas for reuse. In many object oriented computing languages, a computer executing an object oriented application allocates memory for each of the objects created by that application. Memory is generally allocated to, and freed from, the heap in blocks that are sized according to application requirements. Eventually, when objects are no longer being referenced by the application, the memory allocated for the created objects is reclaimed through a garbage collection process, which clears the objects from memory such that the once allocated memory is again available for use.

Some garbage collection processes may involve automatically determining which blocks of memory can be freed by marking objects that are in use and reclaiming the memory of objects that are not marked, a type of garbage collection process that is often referred to as mark-and-sweep garbage collection since useful portions of memory are marked as live during a mark phase, and all unmarked objects are then removed from allocated memory in a sweep phase. Another type of garbage collection process is often referred to as replicating garbage collection, which generally segments memory into "from" and "to" spaces, and copies objects determined to still be in use from the "from" space to the "to" space. Once all live objects have been copied to the "to" space, the remaining objects in the "from" space are removed and the roles of the "from" and "to" spaces are reversed, whereby the former "to" space becomes the new "from" space for the next phase of garbage collection.

Although the process of garbage collection frees memory, it may be problematic in applications where its unpredictable consumption of processor time affects the running of the application. Moreover, for real-time applications that are required to respond within specified time constraints, e.g., in varied environments such as automating semiconductor manufacturing lines, controlling electric power generators, autonomous vehicle controls, rocket launch systems, radar and sonar systems, telecommunication infrastructure management, etc., garbage collection is further complicated due to the frequent interruption of garbage collection that is required to ensure timely responsiveness by such applications.

Therefore, a continuing need exists in the art for garbage collection processes that are fast and efficient, e.g., for use in real-time applications and the like.

SUMMARY

Consistent with one aspect of the invention, a method of pause-less garbage collection may include incrementally performing garbage collection on a memory allocated to an application over a plurality of garbage collection phases and during execution of the application, where the application includes a function having first and second implementations thereof, the first and second implementations having corresponding behaviors with the second implementation thereof additionally performing one or more garbage collection-related operations therein, executing the first implementation of the function in response to a first call made to the function during a first set of garbage collection phases from among the plurality of garbage collection phases, and executing the second implementation of the function in response to a second call made to the function during a second set of garbage collection phases from among the plurality of garbage collection phases.

In some embodiments, the application includes a plurality of functions, each of the plurality of functions having first and second implementations having corresponding behaviors with the second implementation thereof additionally performing one or more garbage collection-related operations therein, and for each function call made in one function among the plurality of functions to another function among the plurality of functions, the function call in the first implementation of the one function calls the first implementation of the other function, and the function call in the second implementation of the one function calls the second implementation of the other function.

Also, in some embodiments, the one or more garbage collection-related operations includes one or more read barriers and/or one or more write barriers. Further, in some embodiments the one or more garbage collection-related operations includes one or more fetches of a non-pointer value from memory, one or more fetches of a pointer value from memory, one or more stores of a non-pointer value to memory, one or more stores of a pointer value to memory, one or more new object allocations, and/or one or more initializations of a field of a newly-allocated object.

In addition, in some embodiments, incrementally performing garbage collection includes garbage collecting within a first region of the memory, where the first region of the memory includes a first plurality of objects stored therein, where the first plurality of objects includes one or more live objects and one or more reclaimable objects, and where garbage collecting within the first region includes, during at least one of the first set of garbage collection phases, incrementally reclaiming the one or more reclaimable objects of the first plurality of objects while retaining the one or more live objects of the first plurality of objects in the first region, garbage collecting within a second region of the memory, where the second region of the memory includes a second plurality of objects stored therein, where the second plurality of objects includes one or more live objects, and where garbage collecting within the second region includes, during at least one of the first set of garbage collection phases, incrementally replicating the one or more live objects from the second region as one or more replicated objects within the first region while maintaining application read and write access to the one or more live objects within the second region via application references to the one or more live objects within the second region, and after replicating the one or more live objects from the second region and during at least one of the second set of garbage collection phases, overwriting the application references to reference the one or more replicated objects within the first region.

Consistent with another aspect of the invention, a method of generating a program compatible with a pause-less garbage collector that operates in a plurality of garbage collection phases may include receiving a first representation of a program, the first representation of the program including a plurality of functions, and generating a second representation of the program from the first representation of the program, where generating the second representation of the program includes generating first and second implementations of each of the plurality of functions, the first and second implementations having corresponding behaviors with the second implementation thereof additionally performing one or more garbage collection-related operations therein, where the first implementation of each of the plurality of functions is configured for execution when the pause-less garbage collector is operating in one of a first set of garbage collection phases among the plurality of garbage collection phases, and where the second implementation of each of the plurality of functions is configured for execution when the pause-less garbage collector is operating in one of a second set of garbage collection phases among the plurality of garbage collection phases.

Also, in some embodiments, the second representation of the program is a native executable representation. Moreover, in some embodiments, the first representation of the program is an intermediate representation. Further, in some embodiments, the first representation of the program is a bytecode representation.

Also, in some embodiments, the first representation of the program is a source code representation and the second representation of the program is one of an intermediate representation or a native executable representation. Further, in some embodiments, generating the second representation further includes generating a plurality of preemption points in the second representation to facilitate preemption of the program by the pause-less garbage collector.

In some embodiments, the one or more garbage collection-related operations for a first function among the plurality of functions includes a read barrier for a read access performed by the first function. Also, in some embodiments, generating the first implementation for a first function among the plurality of functions includes directing a function call to a second function among the plurality of functions to the first implementation of the second function, and generating the second implementation for the first function includes directing the function call to the second implementation of the second function.

Other embodiments consistent with the invention may include a system including a memory and a processor coupled with the memory and configured to perform pause-less garbage collection using any of the aforementioned methods. Still other embodiments consistent with the invention may include a computer program product including a computer readable storage medium including program instructions embodied therewith and executable by an electronic computer processor to perform pause-less garbage collection using any other aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
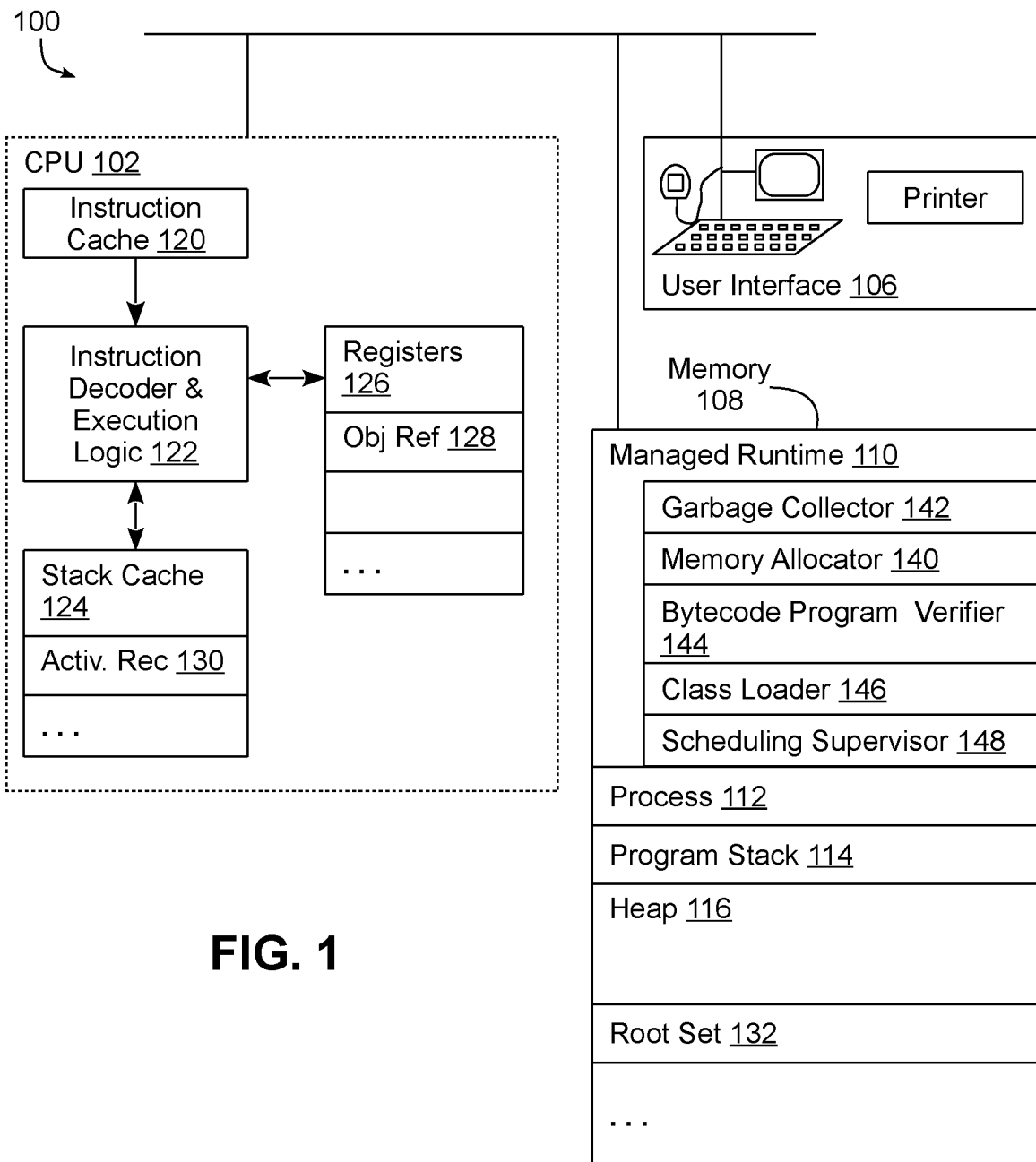
FIG. 1 is a block diagram illustrating an example multitasking computer system within which the various techniques described herein may be implemented.

Time-critical Java software (Java is a trademark of Oracle America, Inc.) has been successfully deployed in a breadth of domains, including control over manufacturing automation, electric power management, autonomous vehicles, telecommunication infrastructure, etc. These successfully deployed applications demonstrate that the high-level benefits of Java can be made available to and are valued by time-critical developers, even though real-time applications implemented in Java have required more CPU and memory resources than the same applications implemented in C. Java is most suitable for large and complex time-critical applications that are not deployed in high (consumer electronics) volumes. With these applications, the costs and risks associated with development and maintenance of software are typically far greater than the total costs of the computing hardware on which the software is deployed. These are the sorts of applications that appreciate that Java developers are often twice as productive during the implementation of new functionality and over ten times as productive during reuse, maintenance, and repurposing of existing functionality in comparison with legacy approaches based on C or C++.

Two technical impediments to adoption of time-critical Java technologies have been that (1) time-critical Java virtual machines run much slower than traditional Java virtual machines due to the overhead of fine-grained coordination between application threads and garbage collection activities, and (2) the response latency of traditional Java threads is approximately 200 μs even on the most responsive of real-time Java virtual machines. This is roughly 20 times slower than the typical response latency of similar threads written in C. The technical solutions described herein address such technical challenges, enabling throughput comparable to traditional Java and response latency comparable to applications written in C in some embodiments. The technical solutions described herein thus address technical challenges rooted in computing technology of performance of Java programs and improve the execution of Java programs by facilitating a pause-less garbage collection for high performance time-critical Java programs. It should be noted that although the examples described herein use Java programs in real-time applications, the technical solutions described herein are applicable to computer programs written using any other computer programming language or a combination thereof, particularly if the language(s) uses garbage collection for memory management, as well as in applications other than real-time and other time-critical application, so the invention is not limited to use with Java programs, or to real-time applications.

As will become more apparent below, the embodiments discussed herein address improvements to pause-less or incremental garbage collection, e.g., as may be used for real-time and other runtime environments. In some embodiments, for example, a hybrid garbage collection methodology may be used to provide a hybrid approach that incorporates features of both mark-and-sweep and replicating garbage collection. In addition, in some embodiments, multiple implementations may be used for the functions of an application to optimize the performance of a function for different phases of a multi-phase garbage collector.

Prior to a more detailed discussion of such features, however, an example hardware and software environment within which the herein-described techniques may be implemented is discussed.

Example Hardware and Software Environment

Turning to the drawings, wherein like parts are denoted by like numbers throughout the several views, FIG. 1 illustrates an example multitasking computer system 100 including a Central Processing Unit (CPU) 102 (e.g., a microprocessor, processor core, etc.), user interface 106, and memory 108, which includes a random access memory (RAM) and non-volatile memory for storage. The memory 108 stores a managed runtime environment 110 and one or more processes 112, each of which may include one or more threads. Each active process in the system is assigned a portion of the computer's memory, including space for storing the application level code 112 executed by the process, a heap 116 that is used for dynamic memory allocation, space for representing the state of each thread that is executing the process, and space for storing each thread's program stack 114. The managed runtime environment 110 further includes a scheduling supervisor 148, which takes responsibility for deciding which of the multiple tasks being executed to dedicate CPU time to. Typically, the scheduling supervisor 148 has to weigh tradeoffs between running application process threads and running garbage collection threads. Further, within the managed runtime environment 110, multiple independently developed applications may run concurrently.

Each thread's program stack 114 may not be in contiguous pages of memory 108, and if not contiguous, the pages or possibly larger contiguous chunks of stack storage are linked together using known techniques. It should be noted that within the process 112, there are multiple threads, and each thread has its own program stack 114.

The CPU 102 includes an instruction cache 120 for providing instructions to an instruction decoder and execution logic 122. The CPU 102 also includes a stack cache 124 for storing in high speed cache memory a portion of the program stack 114, and a set of registers 126 for storing data values, object references 128 and the like. The program stack 114, including the portion in the stack cache 124, is used to temporarily store various data structures and parameters, including activation frames 130 (or records) that are pushed on the program stack 114 each time a function is invoked.

At the start of certain garbage collection phases, the garbage collector scans the root set of pointers 132. It should be noted that, although FIG. 1 depicts a root set 132 as a single block, the root set 132 includes machine registers and certain global memory locations, and the root set can be encoded in the garbage collector as part of the computer executable instructions responsible for scanning of the root set. The root set represents a finitely bounded number of machine registers and memory locations, the accumulation of which provide indirect access to all objects that are currently in use by the process 112. In a pause-less garbage collection system, the number of variables in the root set 132 is very small, typically fewer than 100. The root set does not include the contents of individual thread stacks or the contents of all thread descriptions. Rather, the root set typically includes a reference to a data structure which keeps track of all thread descriptions. Each thread description in turn keeps track of an associated thread stack.

It should be understood that FIG. 1 depicts only a simplified representation of a CPU 102 and the items stored in memory. Also, it should be understood that multiple processes may be executing simultaneously in a computer system, each with its own address space that includes the same types of items as shown in memory 108 of FIG. 1.

The term "object" is herein defined to mean any data structure created by a program or process. The terms "reference" and "object reference" are used interchangeably to describe a data structure that includes a pointer to an object. While the term "pointer" or "object pointer" are sometimes used interchangeably with "reference" and "object reference", object references may include information in addition to a pointer. An object reference may be direct or indirect. A direct object reference directly points to an object header, while an indirect object reference points to an object handle. As used herein, the term "object reference" refers to both types.

When the process 112 associated with the heap 116 needs space for storing an array or other program "object", a memory allocator routine 140 is called/invoked. The memory allocator 140 responds by allocating a block of unused memory in the heap 116 to the process 112. Additional requests for memory result in the allocation of additional memory blocks. If the process 112 continues to ask for more memory, all the space in the heap 116 will eventually be used and the process 112 can fail for lack of memory. Therefore space is desirably replenished by either explicit actions of the program or some other mechanism.

Typically, the process 112 "abandons" much of the memory space that is allocated to its objects. Typically, the process 112 stores references to program objects in allocated memory blocks, and overwrites all references to certain objects after it has finished processing them because it will never need to access those objects again. An object for which there are no references (sometimes called pointers) is often termed an "inaccessible object" or "garbage", and the memory space it occupies is "inaccessible" to the process 112 that once used it.

This technical problem is addressed by recovering blocks of memory space in the heap 116 that are no longer being used by the process 112. Garbage collection is the term used to refer to automatic methods of recovering unused memory in the heap 116. A garbage collector 142 is used to recover unused or abandoned portions of memory in the heap 116 so that the process 112 using the heap will not run out of memory. The programming language's managed runtime environment includes a garbage collector 142. The garbage collector 142 gathers and recovers unused memory upon the occurrence of a predefined event, such as the expiration of a predefined time period, or usage of a certain amount of the available heap.

The garbage collector 142 can use any of several different garbage collection methodologies, as will be discussed in greater detail below. All of such garbage collection methodologies generally attempt to keep live or "accessible objects" and remove any inaccessible objects that are no longer in use. An accessible object may be considered to be any object (e.g., a block of memory) that is referenced, directly or indirectly, by the "roots" or "root set" of a task. Typically, the root set 132 of a process 112 with respect to garbage collection is a set of object references stored in known locations such as certain machine registers 126 and certain global variables, which point to objects used by a process 112. Many of those objects, in turn, will contain references to other objects used by the process 112. The chain, or directed graph, of object references emanating from the root set indirectly points to all of the accessible objects in the heap 116.

Also shown in FIG. 1 are aspects of a computer system that is set up to execute Java-compatible computer programs, e.g., Java bytecode programs. In particular, the managed runtime environment 110 of such a system includes a bytecode program verifier 144 for verifying whether or not a specified Java bytecode program satisfies certain predefined integrity criteria. The managed runtime environment 110 also includes a class loader 146, which loads object classes into the heap and utilizes the bytecode program verifier 144 to verify the integrity of the methods associated with each loaded object class. In one or more examples, the managed runtime environment 110 also includes a bytecode program interpreter (not shown) for executing Java bytecode programs. If the instruction decoder and execution logic 122 is designed to execute Java bytecode instructions, a bytecode program interpreter is not needed.

It will be appreciated, however, that the invention is not limited to use with Java computer programs, and may be used with programs written using other programming languages and/or using other runtime environments, including both native programs in a machine-specific format and interpretable programs in an intermediate or interpretable format. The invention may also be used in connection with programs that are compiled, interpreted or just-in-time compiled, as aspects of the invention may be used in connection with compilation, translation, or optimization between different representations of a program, e.g., between any two of source code, object code, bytecode, machine code, etc.

Hybrid Garbage Collection

In some embodiments, a hybrid garbage collection methodology is used to perform garbage collection, particularly for use in real-time and other time-critical applications. The illustrated embodiments, in particular, utilize hybrid garbage collection in connection with a real-time Java runtime environment (although the invention is not so limited). As compared to C or C++, Java has been found to provide significant development advantages both during initial development and during ongoing maintenance (e.g., fixing bugs, adding new features, porting code to new CPU architectures and new operating systems, integrating existing code within new contexts, etc.). There are also other broad classes of problems that have traditionally not been labeled as "real-time" where the use of Java or other high-level garbage collected languages would be very attractive. However, the existing limitations of real-time Java technologies have impeded its adoption, e.g., in the fields of electronic securities trading, traffic monitoring and adaptive routing, distributed gaming, electronic commerce servers, live sports broadcast editing, cyber-security defenses, and situational awareness for first responders, among others.

The use of Java for time-critical applications has been impeded by performance limitations of existing technologies, including the overhead associated with garbage collection. A hybrid garbage collection methodology as described herein, addresses a number of shortcomings of existing technologies by utilizing a hybrid approach that offers the combined benefits of high memory utilization and adaptive memory defragmentation.

In some embodiments, for example, garbage collection is incrementally performed in first and second regions of memory, each of which including multiple objects stored therein, a portion of which are live objects that are still in use, and another portion of which are reclaimable objects that are no longer in use and are candidates for being reclaimed (which also may be referred to as "dead" objects herein). Garbage collecting in the first region generally employs a mark-and-sweep approach that includes incrementally reclaiming any reclaimable objects in the first region while retaining the live objects of the first plurality of objects in the first region. Garbage collection in the second region generally employs a replication approach that includes incrementally replicating live objects from the second region as replicated objects within the first region while maintaining application read and write access to the live objects within the second region via application references to the one or more live objects within the second region. Then, once the live objects have been replicated, the application references may be overwritten to reference the corresponding replicated objects within the first region, and at least the portion of the second region including the live objects may then be reclaimed.

In specific implementations of this technique, a number of issues associated with conventional approaches may be addressed. For example, scanning of application thread stacks may be performed incrementally, through a collaborative effort between background garbage collection tasks and foreground application thread activities. In addition, only portions of a stack that have been impacted by ongoing execution of a thread may need to be scanned, rather than having to rescan the entirety of each stack. Further, each thread may maintain its own write-log using encoding and maintenance techniques that are much more efficient than has been previously achieved. Moreover, to maintain cache locality and reduce the need for mutual exclusion locks, each application thread may process its own write logs rather than turning this effort over to independent garbage collection threads. Furthermore, to reduce global contention bottlenecks, the processing of write logs may be performed without the use of global locks, and spin-locks may instead be used to protect individual objects that require concurrency control to manage access from independently executing application and garbage collection threads.

Figure 2:
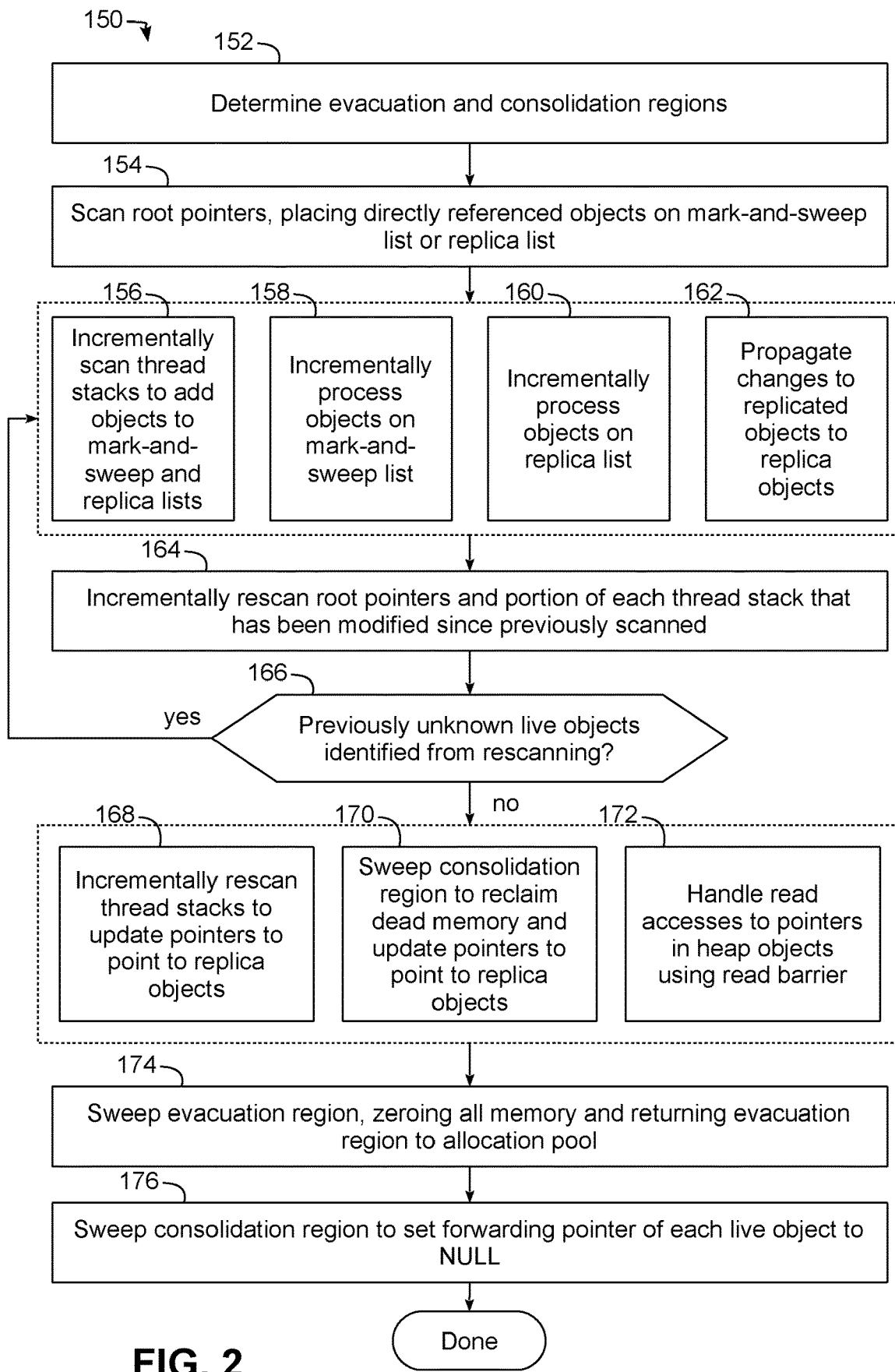
FIG. 2 is a flowchart illustrating an example sequence of operations for performing hybrid garbage collection in the system of FIG. 1.

An example embodiment of a hybrid garbage collection methodology consistent with the invention is illustrated in FIG. 2, with additional reference to FIGS. 3A-3I. FIG. 2 in particular illustrates an example sequence of operations 150 for implementing a single garbage collection pass, and it will be appreciated that this sequence of operations may be performed repeatedly to perform multiple passes over the course of the execution lifetime of an application. FIGS. 3A-3I in turn illustrate an example set of objects A-D in a memory allocation heap 180, and how the operations illustrated in FIG. 2 affect these objects over the course of a garbage collection pass.

Figure 3A:
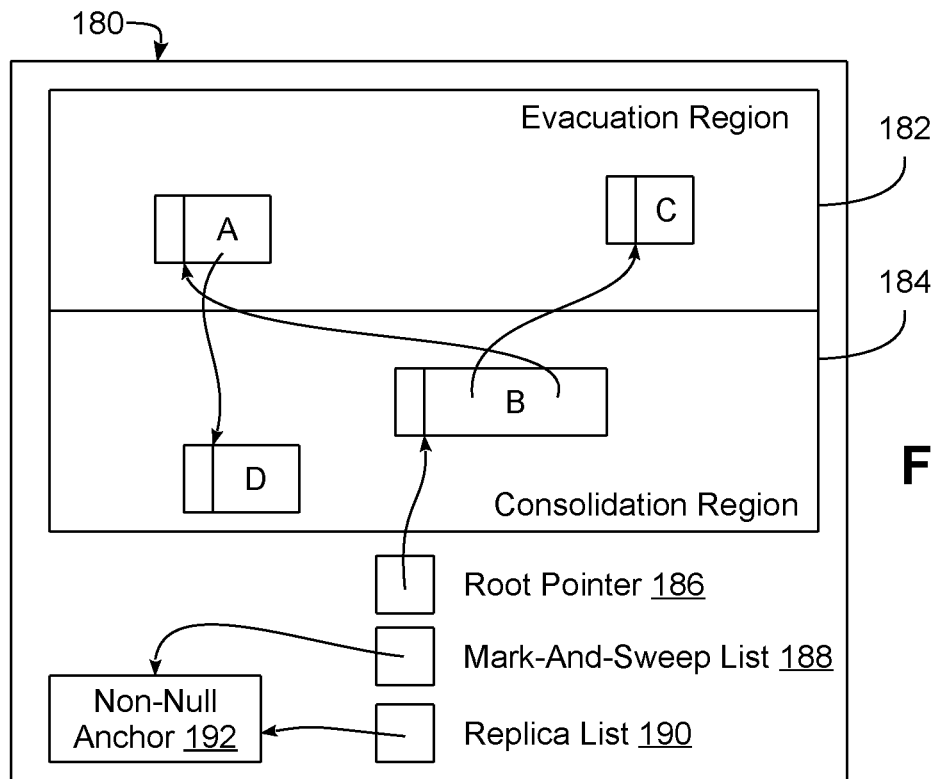
FIGS. 3A-3I are block diagrams illustrating a garbage collection cycle performed with the example sequence of operations illustrated in FIG. 2.

For simplicity of discussion, FIGS. 3A-3I show a single root pointer and only four heap-allocated objects A-D. It will be appreciated that in an actual system, there may be thousands of root pointers, representing the contents of each thread's run-time stack and there potentially may be millions of objects to be garbage collected. FIG. 3A, in particular, illustrates the organization of memory immediately before initialization of a garbage collection pass, including two regions 182, 184 respectively referred to herein as evacuation and consolidation regions, with objects A and C located in evacuation region 182 and objects B and D located in consolidation region 184. In this figure, object B holds pointers to objects A and C. Object A holds a pointer to object D, and a root pointer 186 refers to object B. All other memory is presumed to be reclaimable or unused.

The herein-described garbage collection technique distinguishes between two types of memory regions: an evacuation region 182 and a consolidation region 184. The herein-described technique in part utilizes a replication technique for the evacuation region to replicate all live objects residing in evacuation region 182 into consolidation region 184 so that these objects can be effectively moved outside the evacuation region and the evacuation region may be reclaimed. In particular, after the live objects in the evacuation region have been replicated, the original copies of these objects may be reclaimed, and in some embodiments the entirety of the evacuation region may be reclaimed as a large contiguous free memory segment. The consolidation region 182, in turn is used to consolidate objects within the region to optimize memory utilization in the region. Consequently, an incremental mark and sweep technique may be used in the consolidation region in some embodiments such that live objects within the region are marked as live and maintained in place, and other objects that are not marked during scanning are reclaimed. Each region may be considered to include a plurality of memory locations, which may or may not be contiguous in different embodiments.

Evacuation and consolidation regions, however, are not statically defined, and as will be appreciated below, evacuation regions may become consolidation regions and vice versa, and moreover, multiple evacuation regions and multiple consolidation regions may be defined in some instances, particularly in parallel systems incorporating NUMA memory architectures where some regions of a memory are more localized to certain processors and/or threads, and thus where garbage collection may be distributed among multiple garbage collection threads executing on multiple processors and handing particular regions among the various regions defined within a shared memory space.

Figure 4:
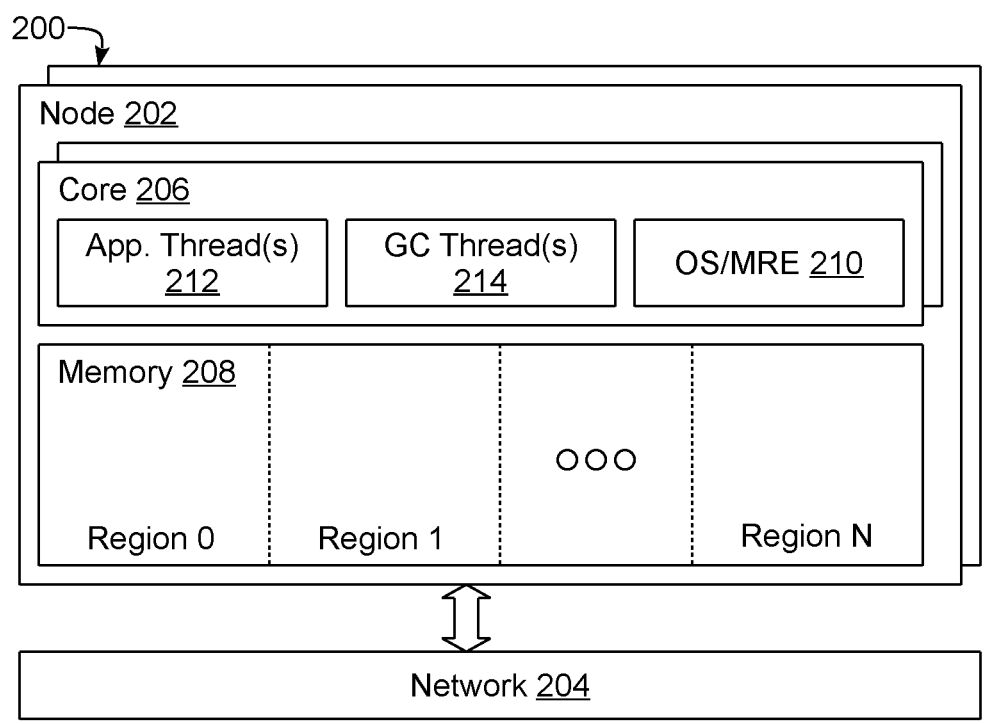
FIG. 4 is a block diagram illustrating an example multinode NUMA computer system within which the various techniques described herein may also be implemented.

FIG. 4, for example, illustrates an example parallel computer system 200 including a plurality of nodes 202 interconnected with one another over a network 204, with each node 202 including a plurality of processing cores 206 and a memory 208 shared by the processing cores 206 on the node 202. Each core 206 may host an operating system (OS) and/or a managed runtime environment (MRE), as well as one or more application threads 212 associated with one or more applications, and one or more garbage collection threads 214 used to perform garbage collection for the application(s) executed by application threads 212. The memories 208 of nodes 202 may collectively define a shared memory space for computer system 200, and due to the multi-nodal architecture utilized therein, collectively define a Non-Uniform Memory Access (NUMA) memory architecture whereby memory on the same node as a particular processing core is more localized and accessible with lower latency than memory on a different node. Each memory 208 may additionally include one or more memory regions (designated as Regions 0 . . . N), and it will be appreciated that each processing core 206 on a given node 202 may have particular affinity and lower latency to at least a subset of the memory regions on the node.

With such an architecture therefore, garbage collection may be handled in a distributed fashion, and consequently various regions in the shared memory space may be designated at different times as evacuation or consolidation regions. The invention may be utilized with other computer and/or memory architectures, however, so the invention is not limited to use with the particular architecture illustrated in FIG. 4.

In the illustrated embodiment of FIGS. 2 and 3A-3I, each region maintains multiple memory allocation pools, which may be represented as doubly-linked lists, e.g., using each free segment's gc_pointer and class_object fields as forward and backward links, respectively. Allocation lists for particular regions of memory may be associated with the core to which the region of memory is most closely affiliated.

To distinguish free segments from live objects during sweeping, the gc_pointer field of a free memory segment may use the code 0x01 in its least significant 2 bits. An advantage of having the lists be doubly linked is because this allows a memory sweep to coalesce an existing free segment with newly found neighboring free memory in constant time, removing the free segment from the list on which it previously resided and inserting the new larger free segment onto the list appropriate for its new size. A separate set of allocation pools may be used to represent free segments that begin on an odd address. These free segments may be used, for example, for representing array objects, although either type of segment can be converted into the other with insertion of a pad word in some embodiments. It may also be desirable for each list of free segments to be locked independently so as to reduce contention between multiple threads reserving memory for replica objects.

It will be appreciated, however, that other types of data structures may be used in other embodiments, so the invention is not limited to the use of doubly-linked lists linked via gc_pointer and class_object fields.

Returning now to FIG. 2, at the beginning of a garbage collection pass, sequence of operations 150 may determine evacuation and consolidation regions in block 152. It will be appreciated, in particular, that given a choice between multiple candidate evacuation regions, it may be desirable to choose a region that has a substantial amount of free memory (i.e., a region that is largely empty, so there is not very much data that actually needs to be copied out of the region) and/or within which the free memory is relatively fragmented (so that there is a significant benefit from defragmenting this memory). The evacuation region need not be contiguous in some embodiments, and thus among a plurality of memory segments in the evacuation region, those memory segments may be contiguous or non-contiguous in different instances. However, it may be beneficial in some embodiments to utilize contiguous memory segments to simplify the identification of objects residing in an evacuation region by performing range checks on object addresses. Suppose, for example, that a NUMA architecture has 4 GBytes of memory that is closely associated with each of 16 different cores, that all 64 GBytes of this memory is contiguous, and that the address of the first block is an integral multiple of 1 GByte. One possible way to organize memory is as 64 1-GByte allocation regions, with four memory regions associated with each core. Each pass of the garbage collector may evacuate a different one of the four memory regions associated with each core by testing the address of an object's membership within the evacuation region using an InEvacuationRegion macro defined below in Table I. Use macro operand i=0, 1, 2, or 3 to represent the four possible choices for the evacuation region:

TABLE I

InEvacuationRegion Macro

| | |
|---|---|
| #define GByte | (0x01L << 30) |
| #define TwoGByte | (GByte << 1) |
| #define FourGByte | (GByte << 2) |
| #define RegionMask | (GByte \| TwoGByte) |
| #define SixtyFourGByte | (FourGByte << 4) |
| #define RegionBase | (determined-by-architecture-constraints) |
| #define RegionEnd | (RegionBase + SixtyFourGByte) |
| #define InEvacuationSpace (o, i) | (((o) >= RegionBase) && ((o) < RegionEnd) \ && (((o) & RegionMask) == ((i) << 30))) |

In some embodiments, objects may be allowed to span the boundaries between the evacuation region and the consolidation region. Logically, an object may be considered to reside within the region that holds its starting address.

As noted above, a consolidation region represents memory from which garbage may be collected using an incremental mark and sweep technique, as well as a region to which live objects currently residing within the evacuation region will be relocated. As with an evacuation region, a consolidation region may include non-contiguous or contiguous memory segments in different embodiments. Given a choice between multiple segments or subregions of a consolidation region from which to allocate a replica of an existing live object, it may be desirable to allocate within a segment or subregion that is already most heavily utilized, as placing a new object into a region that is already highly utilized will increase the region's utilization, further reducing the likelihood that this region will be selected in the near future for defragmentation.

With reference to FIG. 3A, at the start of garbage collection, a mark-and-sweep list 188 and a replica list 190 are both empty, which is designated in the illustrated embodiment by pointing to or referencing a non-null anchor 192. Root pointer 186 points to object B. As will become more apparent below, as garbage collection discovers that certain objects are live, these objects are inserted onto one of these two lists.

Figure 3B:
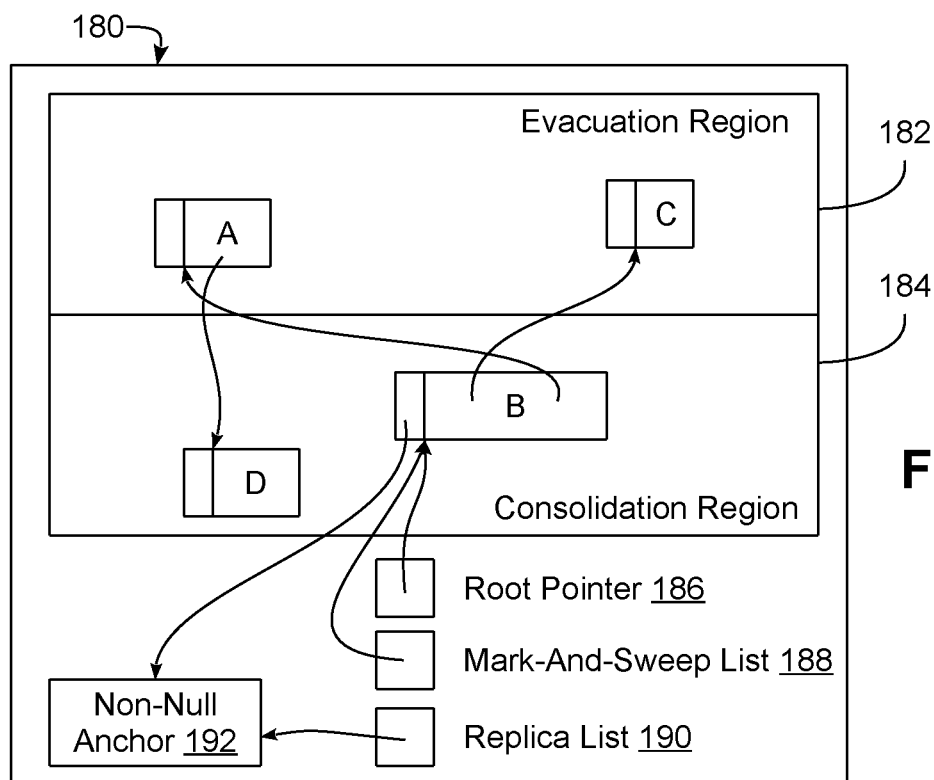

Returning to FIG. 2, once evacuation and consolidation regions are selected, block 154 scans root pointers and places directly referenced objects on either mark-and-sweep list 188 or replica list 190 based upon within which region such objects reside. Thus, as illustrated in FIG. 3B, since root pointer 186 points to object B, and since object B is in consolidation region 184, the object is inserted onto mark-and-sweep list 188.

Returning again to FIG. 2, multiple background garbage collection threads share responsibility for scanning and copying the contents of live objects on the mark-and-sweep and replica lists. Thus, as illustrated by blocks 156-162, a number of operations are performed in parallel until each task is completed. Block 156, for example, incrementally scans thread stacks, placing previously unknown referenced objects onto the mark-and-sweep or replica lists. Block 158 incrementally scan objects on the mark-and-sweep list, placing previously unknown referenced objects onto the mark-and-sweep or replica list and overwriting a gc_pointer field on the scanned object with a pointer to the self-same object. Block 160 incrementally copies objects on the replica list, replacing each replicated object's gc_pointer field with a pointer to the object's new location. Also, for any value written into a replicated object, block 162 propagates the changes to the object's replica. If an overwritten object was not previously known to be live, that object may also be placed on the mark-and-sweep or replica list, and if a pointer value written to memory refers to an object that was not previously known to be live, that object may also be placed on the mark-and-sweep or replica list.

Figure 3C:
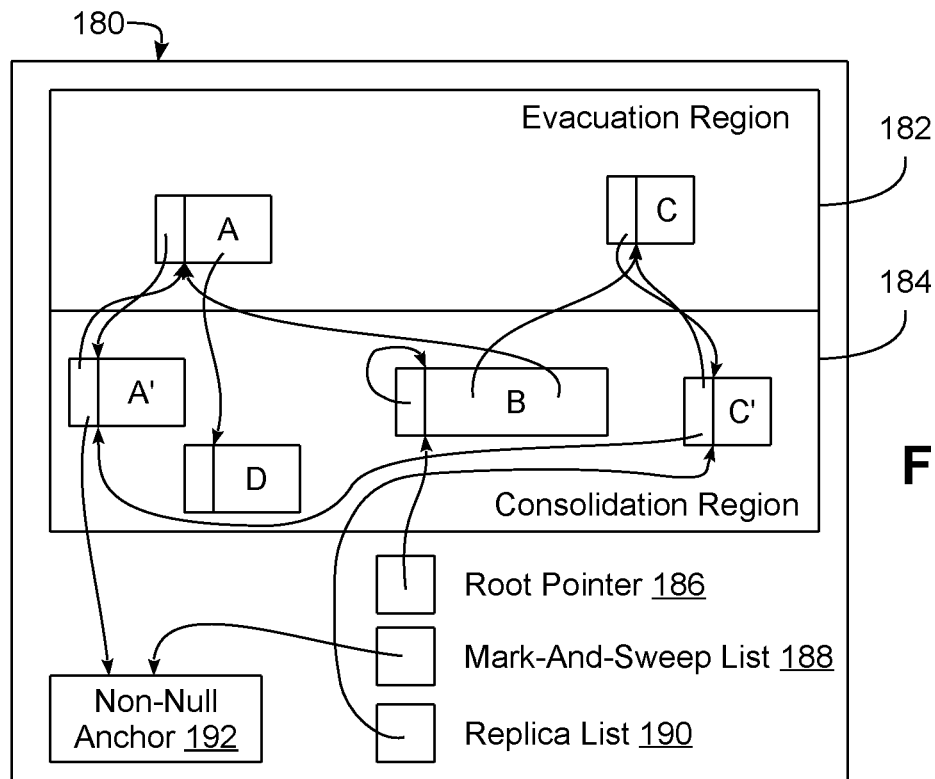

As illustrated in FIG. 3C, for example, one of the background garbage collection threads may determine that the mark-and-sweep list is not empty, and may take responsibility for scanning an object on this list. In scanning object B, the thread may discover that objects A and C are also alive, and since both of these objects reside within the evacuation region, memory may be reserved for replication of these two objects in the consolidation region, and the so-reserved memory (designated as object A' and object C') may be placed onto replica list 190. Note that the memory reserved for replicas is not necessarily contiguous. For objects of certain predetermined small sizes, memory may be allocated from existing size-specific allocation pools using an exact-fit strategy in some embodiments, while if the size of the object to be replicated exceeds a particular threshold, or if the allocation pool for objects of the desired size is empty, allocation may occur from a larger size pool using a first-fit technique, returning the excess memory to the appropriate free pool. Thus, replication of an object into the consolidation region in some embodiments may efficiently fill in the consolidation region with replicated objects, thereby improving memory utilization in the consolidation region.

As shown in FIG. 3C, within the memory reserved for replicas (objects A' and C'), the class_object field is overwritten with a backwarding pointer, and for each of the objects marked within the evacuation region (objects A and C), the gc_pointer field is overwritten with the location of the memory reserved for the replica (objects A' and C'). This non-null forwarding pointer identifies the objects as having been marked. During a subsequent phase of garbage collection, however, these forwarding pointers may serve a different purpose, as will be discussed in greater detail below.

After object B is completely scanned, it is removed from the mark-and-sweep list 188 and its gc_pointer field is overwritten with a reference to itself. For the moment, this non-null self-referential pointer identifies object B as having been already marked. During a subsequent phase of garbage collection, this pointer may serve a different purpose, as will be discussed in greater detail below.

Figure 3D:
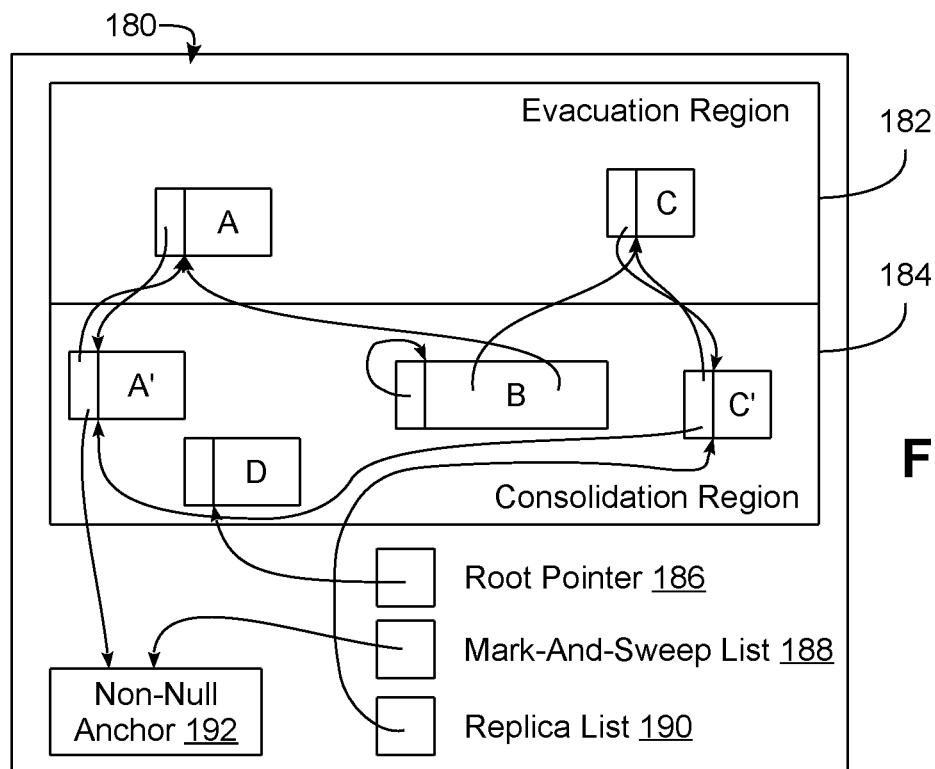
Figure 3E:
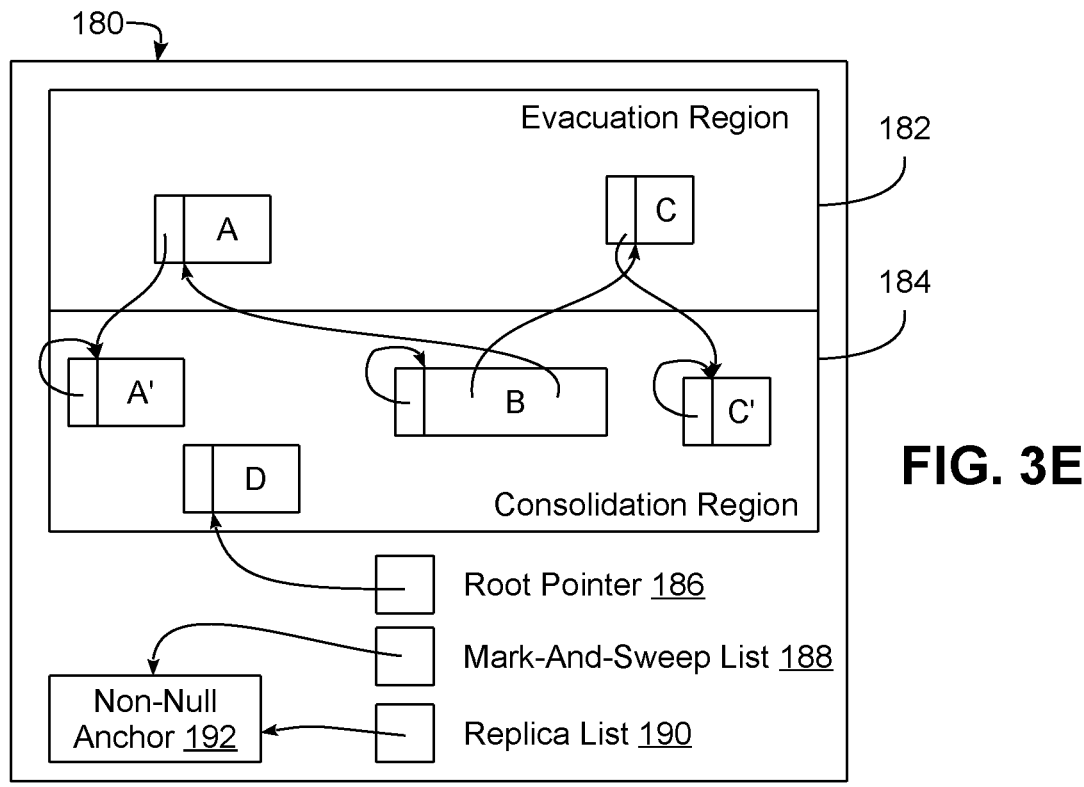

Suppose now that at this point garbage collection is preempted by an application thread. Assume that the application thread fetches into its root pointer the pointer to object D from within object A, and then it over-writes this pointer field of A with a null value. Object D is still live, since it is referenced from the root pointer. However, the garbage collector will not see that object D is still live during its replication of object A. Thus, when garbage collection resumes following these actions of the application thread, memory appears as shown in FIG. 3D. Note that objects A, B, and C are no longer referenced from a root pointer. Officially, they are now dead. Since they became dead during this pass of garbage collection, their memory will not be reclaimed until the subsequent garbage collection pass.

Eventually, however, garbage collection processes the mark-and-sweep list 188, copying the contents of objects A and C into the consolidation region. Once these objects have been copied, they are removed from the replica list 190 and the gc_pointer field is overwritten with a self-referential pointer. The replica no longer maintains its backwarding pointer, as this field is overwritten with the copied class_object value, with the resulting state shown in FIG. 3E. Note that at this point all application threads continue to see objects residing in the evacuation region version of memory.

Returning to FIG. 2, as illustrated in block 164 it may be necessary to incrementally rescan root pointer and the portion of each thread stack that has been modified since it was previously scanned to check whether there might exist additional live objects that have not yet been marked for relocation. Block 166 then determines whether any previously unknown live objects have been identified from rescanning, and if so, returns control to the four parallel operations of blocks 156-162. This incremental process continues until no more previously unknown live objects are identified from rescanning.

Figure 3F:
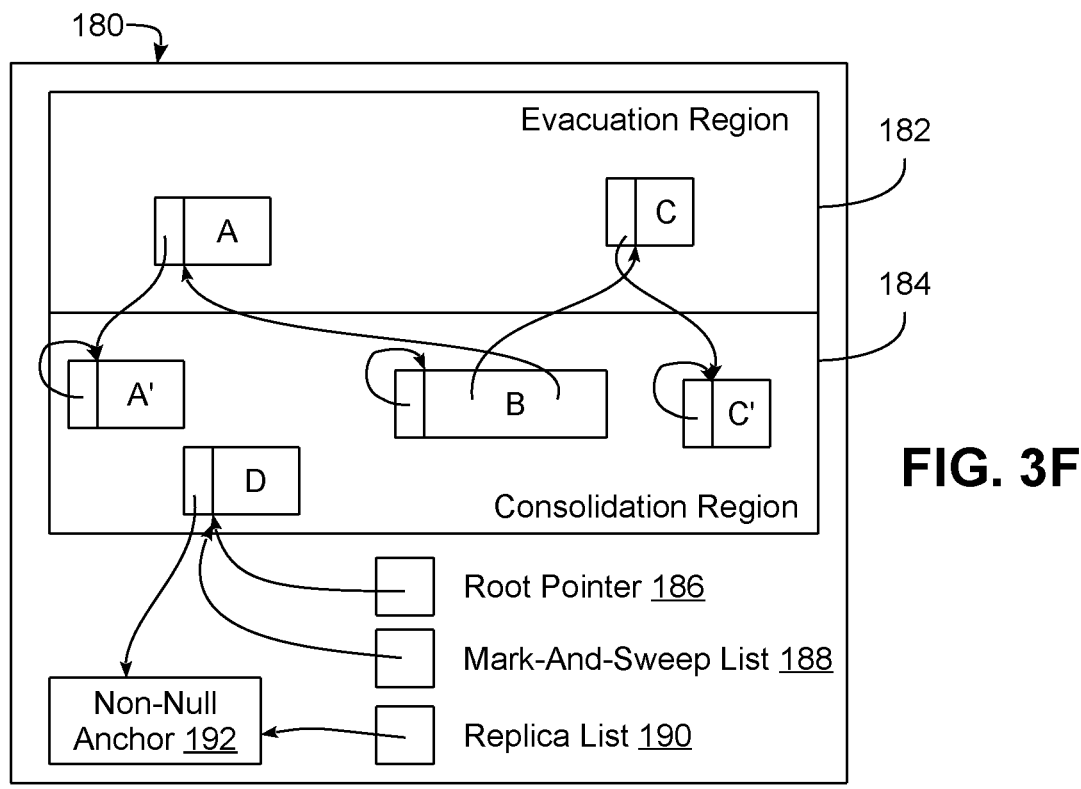

Thus, for example, as illustrated in FIG. 3F, upon scanning the root pointer 186, a new live object D will be discovered. Since this object does not reside in the evacuation region, it may be placed on the mark-and-sweep list 188.

Figure 3G:
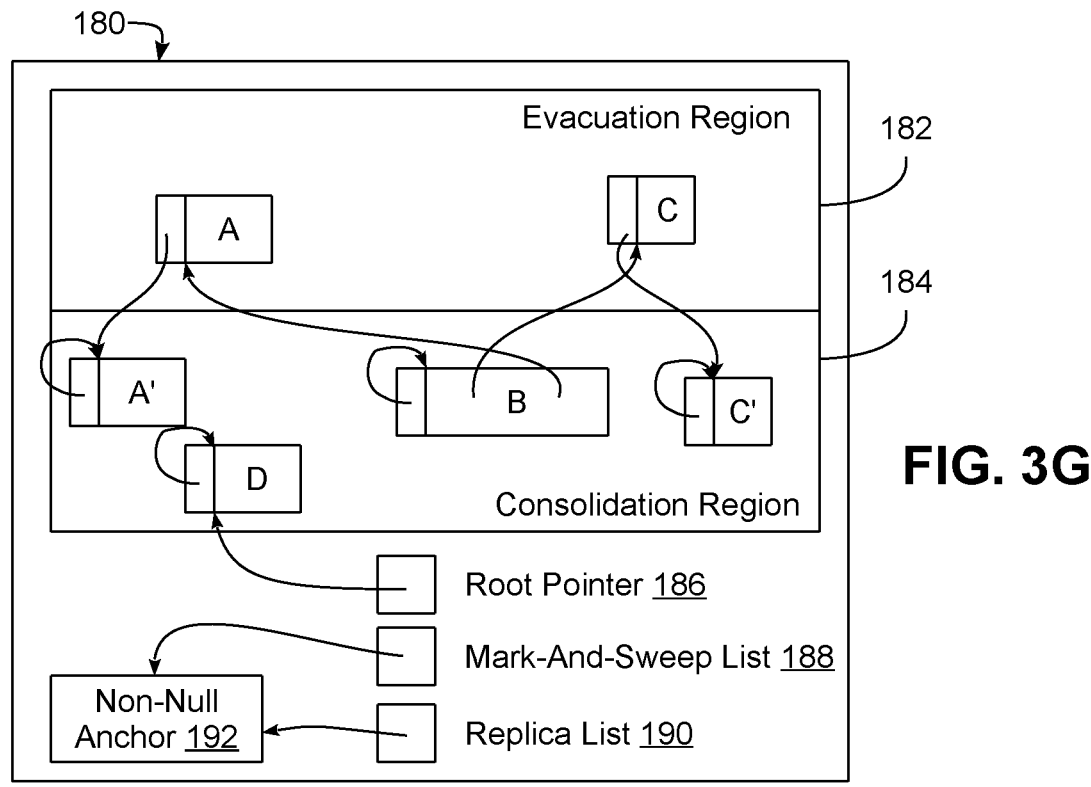

Though the likelihood of occurrence is relatively low, a relatively rare pathology may exist during termination of this phase of garbage collection. If object D holds a pointer to a very deeply linked data structure (say N levels deep), and at each level of the data structure, the pointers to the next deeper level are hidden from the garbage collector in the same way that object D's references had been hidden from the garbage collector, then termination of the replication phase may require N rescans of the root set. Thus, during a wind-down phase of garbage collection, the garbage collector may continue to process any objects on the mark-and-sweep list or on the replica list, and may repeatedly scan the root set in search of additional live objects that have not yet been marked. This garbage collection phase thus ends when the mark-and-sweep list and the replica list are both empty, and rescanning of the root set does not add any new objects to either list, as illustrated in FIG. 3G.

Returning again to FIG. 2, once no more unknown live objects are identified from rescanning, a number of operations are performed in parallel, including overwriting application references to point to replica objects in the consolidation region rather than the original objects in the evacuation region. Specifically, block 168 incrementally rescans each thread stack, replacing any pointers to objects residing in the evacuation region with pointers to the replica objects in the consolidation region. Block 170 sweeps through the consolidation region, reclaiming dead memory and overwriting evacuation region pointers contained within live objects with pointers to the replica objects in the consolidation region. In addition, as illustrated by block 172, read accesses to pointers in heap objects during this phase are processed using a read barrier that replaces the fetched pointer value with the value of the gc_pointer field of the object referenced by the fetched pointer value.

As such, in this phase of garbage collection, every root pointer that holds a reference to an object residing in the evacuation region is overwritten with a reference to the corresponding replica object. This is done incrementally, but it appears to take place atomically from the perspective of all running application threads. Thus, from this point forward, the application sees only the replica objects, and the application can no longer see any object residing within the evacuation region. The invariant is maintained by enforcing a very efficient read barrier only during this phase of garbage collection. Whenever a reference is fetched from within an existing object or array, the fetched value is indirected through the gc_pointer field of the referenced object before the value is loaded into a root pointer. If, for example, the application were to fetch the field of object B that refers to object A, a reference to object A' would be obtained instead.

Figure 3H:
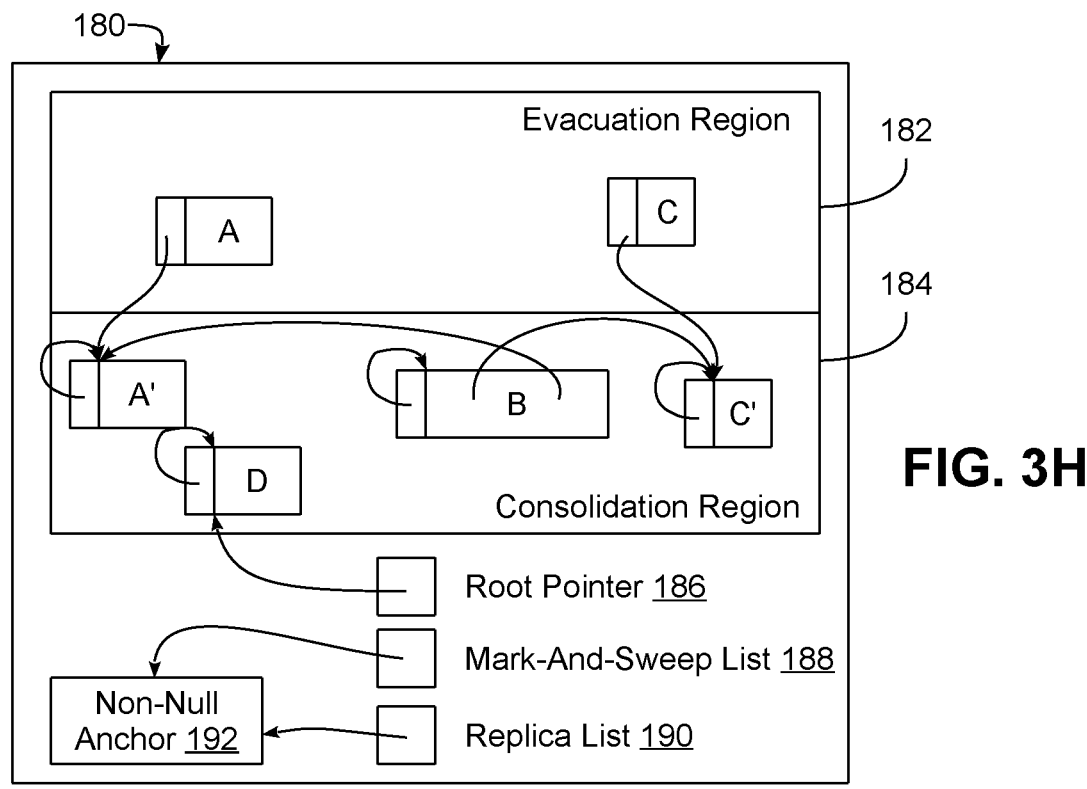
Figure 3I:
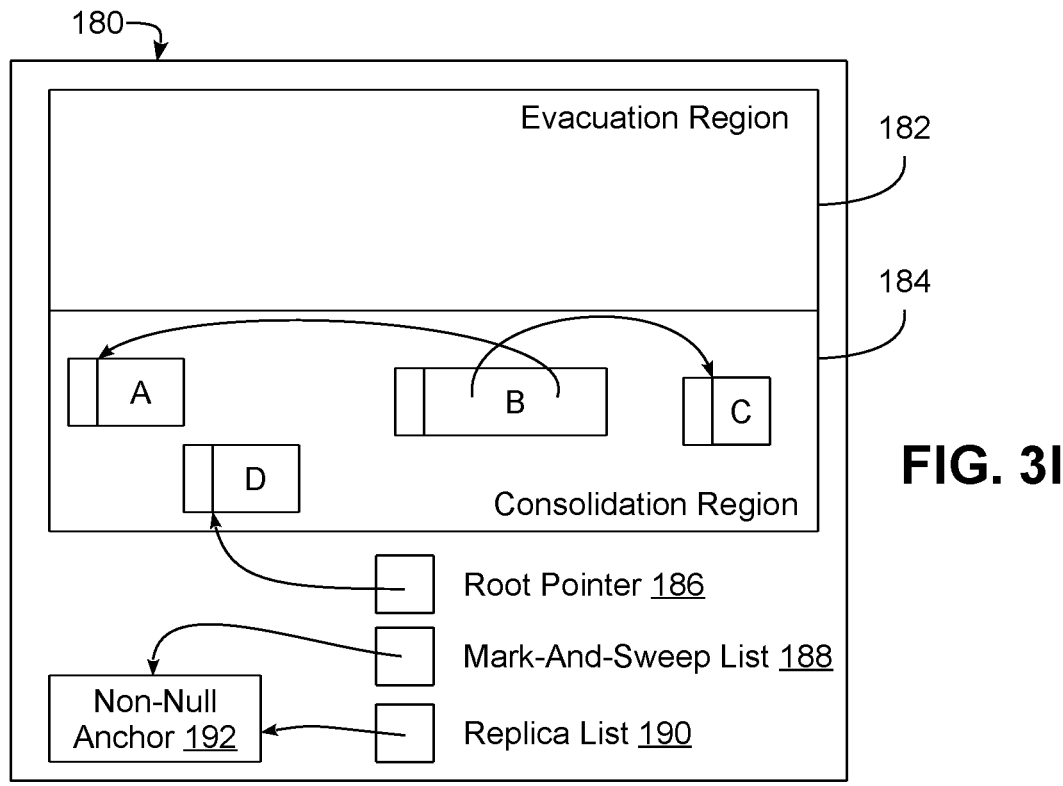

In addition, during this phase of garbage collection, background garbage collection threads sweep through the entire consolidation region, and when garbage is found (as represented by a null-valued gc_pointer field), it is coalesced with neighboring garbage and added into the free pool. When live objects are found, their contents are rescanned and any references to the evacuation region are replaced with references to the associated replica objects in the consolidation region. At the end of this phase of garbage collection, memory is as illustrated in FIG. 3H (of note, the allocation pools are not shown, but these have been replenished by the sweep process).

Returning again to FIG. 2, at this point, the objects residing in the evacuation region are no longer required. As such, block 174 sweeps through the evacuation region, zeroing out the memory and adding the entirety of that memory into the allocation pool. Block 176 then sweeps through the consolidation region once again to zero out the gc_pointer fields on all live objects. The memory is then in the condition illustrated in FIG. 3I, and the garbage collection pass is complete with the evacuation region cleared and with all four objects A-D resident in the consolidation region.

Figure 5:
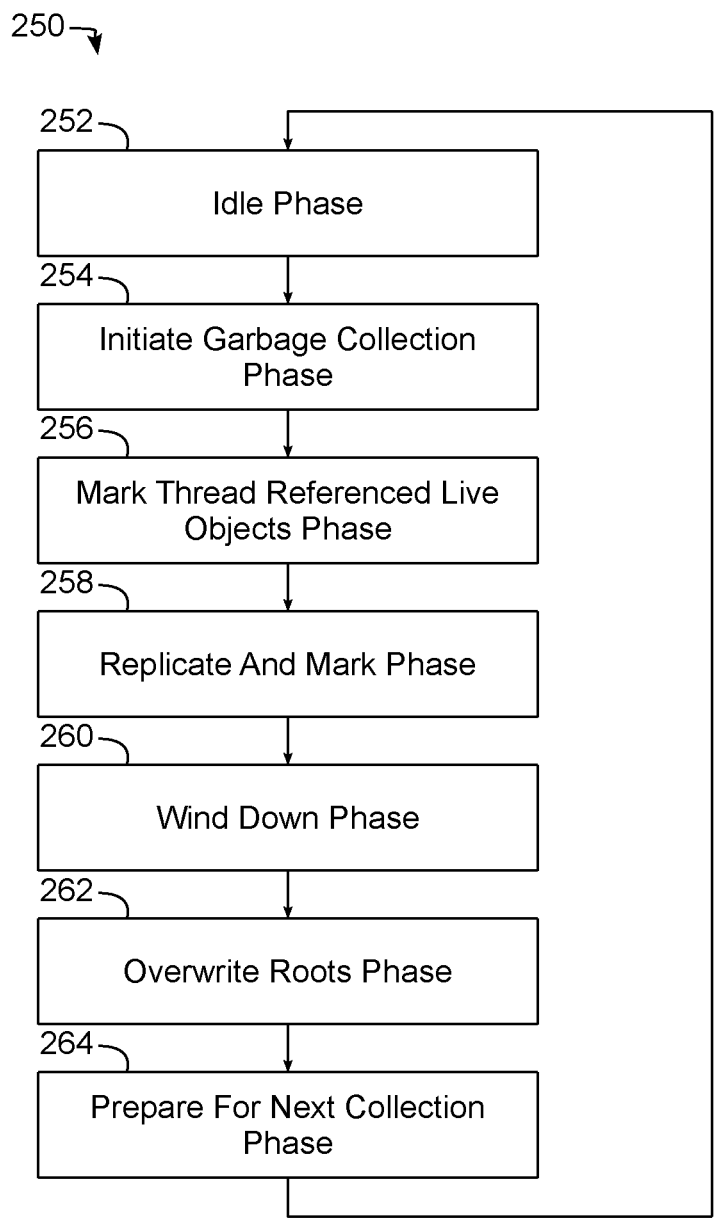
FIG. 5 is a flowchart illustrating example phases in a hybrid garbage collection process consistent with some embodiments of the invention.

Now turning to FIG. 5, this figure illustrates another sequence of operations 250 providing an overview description of another example embodiment of a hybrid garbage collection methodology consistent with some embodiments of the invention, and including seven phases represented by blocks 252-264 respectively, with the garbage collector proceeding incrementally through each phase in a sequenced manner. Each of these phases is discussed in greater detail below:

Idle Phase (block 252): During this phase, garbage collection is idle and there is no work performed by garbage collection threads. Implementation of a garbage collection write-barrier may be very minimal. Post-processing of a write log may simply discard all entries. Garbage collection may be initiated by sequencing to the next phase, e.g., when the projected time for completion of garbage collection if started at the current time approaches too closely to the projected time for depletion of a memory allocation pool.

Initiate Garbage Collection Phase (block 254): During this phase, certain (non-thread-specific) global root pointers are scanned and the referenced objects are marked, either for replication or for scanning in place. Garbage collection threads are set up to begin the effort of scanning thread stacks, and individual application threads are advised of their need to begin tracking their access to heap-memory objects.

Mark Thread Referenced Live Objects Phase (block 256): All of the objects most closely affiliated with particular cores may be gathered onto two core-specific mark lists. One list holds objects that are going to be replicated in order to defragment the memory region within which they reside. The other list holds objects that are simply going to be scanned and preserved in place. All of these objects may subsequently be processed by a core-specific garbage collection thread. This helps maintain cache locality and reduces the need for inter-core synchronization.

Replicate And Mark Phase (block 258): This phase begins with scanning all of the objects on the core-specific mark-and-sweep lists. After all object scanning is completed, the effort turns its attention to replicating all objects on the core-specific replica list. As objects are copied, any pointers contained therein are scanned and the referenced objects are marked if they had not been marked previously. Marking new objects creates additional scanning and copying workload. This phase ends when all marked objects have either been scanned or replicated. In the case that certain objects have been replicated, the application continues to see only the original object, and cannot yet see any replicas. Write-log post-processing during this phase may replicate every write to an evacuation object, mark as live every object that is overwritten by a write operation, and mark every object that is referenced by any pointer value stored into memory. At the end of this phase, every known live object, including newly allocated objects, has its gc_pointer field set to represent a forwarding pointer. For evacuation objects, the forwarding pointer refers to the address of the replica object. For all other objects, the forwarding pointer refers to itself.

Wind Down Phase (block 260): Though all previously marked objects have either been relocated or scanned in place, there is still a possibility that some live objects have not yet been marked. Pointers to these "lost objects" might exist within thread stack activation frames. In this phase, the portions of each thread stack that have potentially been modified since the prior scan of the stack may be rescanned. For each newly identified live object, a garbage collection thread scans and/or copies its contents. This process is repeated until no additional live objects are marked during rescanning of all thread stacks. Write-log post-processing may continue to replicate every write to an evacuation object, and may continue to mark as live every object that is overwritten by a write operation, and continue to mark every object that is referenced by any pointer value stored into memory. During this phase, each application thread may be required to rescan the most recently modified portion of its thread stack, although normally, this phase of garbage collection will be short lived. By the end of this phase, all newly identified live objects will have been configured such that their gc_pointer field represents a valid forwarding pointer either to itself or to the object's replica object.

Overwrite Roots Phase (block 262): Having identified and replicated all live objects, each root pointer that refers to an evacuation object may be overwritten with a pointer to the associated consolidation replica. This is done incrementally, by scanning each thread stack one activation frame at a time. Additional efforts during this phase of garbage collection may include sweeping through all memory in the consolidation region. For any dead objects (i.e., where the gc_pointer field equals null) in the consolidation region, the object's memory may be swept up into allocation pools. For all live objects in the consolidation region, the objects may be scanned and any references to evacuation objects may be replaced with references to the associated replicas. In addition, during this phase, a read barrier may be implemented, whereby every fetch of a pointer value is indirected through the gc_pointer field in order to obtain the most current location of the referenced object. No write barrier, however, is generally required during this phase because all live objects have already been identified, and the application can no longer see references to evacuation objects.

Prepare For Next Collection Phase (block 264): During this phase, a sweep may occur once more through memory, zeroing all of the evacuation memory, and overwriting all gc_pointer fields in the consolidation region with null in preparation for the next pass of garbage collection.

In order to implement an optional read barrier without compromising overall system performance, it may be desirable in some embodiments to utilize multiple function implementations that are "active" during and thus executed during different garbage collection phases. For example, one implementation of each function may implement a read barrier for each read access to an object, and may be active only during the Overwrite Roots Phase (block 262). Another implementation of each function may omit such a read barrier but otherwise have corresponding behaviors from the perspective of the application. In the illustrated embodiment, for example, translations of Java bytecodes to machine code may implement read barriers by translating getfield and getstatic instructions with reference fields, and the aaload instruction, to all include an extra indirection through the referenced object's gc_pointer field.

By doing so, an application read barrier may be selectively enabled or disabled depending upon the current phase of garbage collection, thereby enabling a read barrier to be enabled, for example, during the Overwrite Roots Phase (where application references are overwritten), but be disabled during other phases, such that read accesses to objects during the Overwrite Roots Phase include an extra indirection through the referenced object's gc_pointer field, but with read accesses to objects during other phases omitting the extra indirection, and thus eliminating the overhead associated therewith.

In addition, preemption points and trampoline handlers may be used to manage switching between the different function implementations. Function calls in function implementations may also be configured to call corresponding implementations for the called functions, as will be discussed in greater detail below. As such, when executing the Overwrite Roots Phase implementation of a function, all function invocations may flow to the Overwrite Roots Phase implementation of the invoked function. Likewise, when executing the normal (without read barrier) implementation of a function during any other phase of garbage collection, all function invocations may flow to the normal implementation of the function.

Further, to facilitate fast memory allocation by application code, each thread in some embodiments may be configured to allocate from a thread-dedicated large segment of free memory by simply bumping an allocation pointer. Large allocations that exceed a configuration-dependent threshold size may also be allocated from a global pool in some embodiments.

Further, in some embodiments, it may be desirable, e.g., in some real-world Java applications, to support pinning objects so that they can be efficiently shared with native code, e.g., for sharing with an operating system or coprocessor, such that relocation of an object may be temporarily inhibited while the object is pinned. This may be needed, for example, if a network I/O service needs to fill the contents of a Java array with data received from a network socket. Interface protocols may be designed to allow some flexibility in how the garbage collector interacts with object pinning. For example, even though an object might be pinned, the garbage collector may choose to allocate memory for its replica object and may choose to copy the object's content. If the object is un-pinned prior to the moment that the copying of some other replica object or the post-processing of some write log needs to commit to the object's "permanent address", the garbage collector may proceed to replace the original object with the replica object. Otherwise, the garbage collector may choose to abandon the replica object and preserve the original object in place. The integrity of the herein-described garbage collection methodology generally does not require that the evacuation-space be totally emptied. Moreover, if a pinning request is received while garbage collection is taking place, it sometimes may be possible to pin the replica object rather than the original. Some fixup may need to be performed, however, when the object is unpinned, depending on which phases of garbage collection are active when the pin and unpin actions take place.

Thus, it may be seen that a hybrid garbage collection methodology may be used to incrementally reclaim dead or reclaimable objects through a hybrid approach that offers comparatively greater memory utilization than replicating garbage collectors while also reducing memory fragmentation. Such a methodology may, in some embodiments provide incremental, concurrent, parallel garbage collection with light-weight read and/or write barriers that are only enabled for certain garbage collection phases, with few synchronization locks and memory fences, with scalability to large numbers of cores and large amounts of NUMA memory, and with garbage collection efforts efficiently partitioned between cores so that each core operates primarily on local memory residing in local caches. The invention, however, is not limited to the specific embodiments discussed herein, however, as will be appreciated by those of ordinary skill having the benefit of the instant disclosure.

Multiple Function Implementations for Garbage Collection

As noted above, in some embodiments it may be desirable to utilize multiple implementations of functions in an application to improve application performance in runtime environments incorporating pause-less or incremental garbage collection. In such embodiments, two or more implementations may be supported for at least a portion of the functions in an application, with different implementations executed based at least in part on the phase in which multi-phase garbage collection is currently in. The different implementations of a function have corresponding behaviors but differ from one another in terms of their performance of garbage collection-related operations.

The term "function" is used herein to refer generically to any callable unit of application code, and may be considered to refer equally to subroutines, routines, methods, object methods, procedures, subprograms, or other types of callable units supported by different programming languages and/or environments. Thus, while the term "function" may have a particular meaning in some programming environments (e.g., as a type of callable unit that returns a result, as contrasted with a subroutine that does not return a result), within the context of this disclosure the term should be considered to encompass practically any type of callable unit in a software application.

Two implementations of a function may be considered to have corresponding behaviors when those two implementations operate in the same manner from the perspective of the application within which they are included, i.e., given the same inputs and/or state of a computer when executed, two implementations that have corresponding behaviors will process those inputs and/or change the state of the computer in a substantially identical manner.

Furthermore, the garbage collection-related operations that can be implemented differently in different implementations may include any operations that are incorporated into a function for the purpose of interacting with or otherwise supporting garbage collection for memory allocated to an application. For example, read and write barriers may be considered to be types of garbage collection-related operations; however, they are not exclusive, and other types of garbage collection-related operations may be used in various embodiments, including operations such as fetching a non-pointer value from memory, fetching a pointer value from memory, storing a non-pointer value to memory, storing a pointer value to memory, allocating a new object, initializing the fields of a newly allocated object, etc. Moreover, the types of garbage collection-related operations implemented by different implementations may vary from one another in other manners, e.g., based upon implementing different types of read and/or write barriers on different implementations, performing different sub-operations when handling read and/or write barriers in different implementations, reading and/or storing different data, etc.

In some embodiments, for example, different phases and/or modes of garbage collection may require different amounts of interaction between application code and background garbage collection activities. Thus, in some embodiments, it may be desirable to use different implementations of a function to handle the particular interactions required for different phases of garbage collection. In some embodiments, for example, it may be desirable to implement, for each implementation of a function, a minimum amount of additional garbage collection overhead required for a particular phase or set of phases among the multiple phases of a multi-phase garbage collector during which a particular implementation is to be used. Consequently, if a particular phase or set of phases of a garbage collector introduce garbage collection-related overhead into a function that is not required in other phases of the garbage collector, that overhead may be avoided in those other phases by executing other implementations that do not incorporate that additional overhead, thereby improving overall application performance.

For the aforementioned hybrid garbage collection methodology described above, for example, during an idle phase no coordination efforts are generally required, and application code generally requires neither a read barrier nor a write barrier. During early phases, no read barrier may be required, however, a write barrier may be used to track the writing of pointer values to memory, whereby the write barrier remembers any pointer value written to memory and the object and offset to which the pointer value was written. During a replication phase, a write barrier may be used to remember pointer values written to memory as well as writes of non-pointer values to memory, e.g., to record the address of an overwritten object and an offset of the field that was overwritten. During an overwrite-roots phase, no write barrier may be required; however, a read barrier may be used any time a pointer field is read from memory to consult the object referenced by the fetched pointer and replace the value of the fetched pointer with the referenced object's forwarding pointer (which, if not replicated, will point to the selfsame object).

Thus, in some embodiments, it may be desirable to utilize different function implementations for the idle phase, the early phases, the replication phase and the overwrite-roots phase, with the idle phase implementation including no read or write barriers, the early phases implementation including no read barrier but including a first type of write barrier, the replication phase implementation including no read barrier but including a second type of write barrier, and the overwrite-roots phase implementation including no write barrier but including a read barrier. In other embodiments, however, since write operations are comparatively less frequent (about 10× less frequent in many applications) than read operations, it may be desirable to use two implementations that differ from one another based upon whether a read barrier is implemented, such that during the overwrite-roots phase, one implementation incorporating read barriers is executed, while in all other phases another implementation that omits read barriers is used, with both implementations including sufficient functionality to implement both types of write barriers.

It will be appreciated that incorporating multiple implementations of functions may provide benefits in terms of application execution efficiency as well as post-processing efficiency. However, it will also be appreciated that incorporating multiple implementations may also increase the size of the application code and may, in some instances, lead to poorer instruction cache performance due to the fact that the likelihood that a desired implementation of a function is already cached is lower, particularly when garbage collection transitions to a new phase that utilizes a different implementation of a function that was previously executed.

Figure 6:
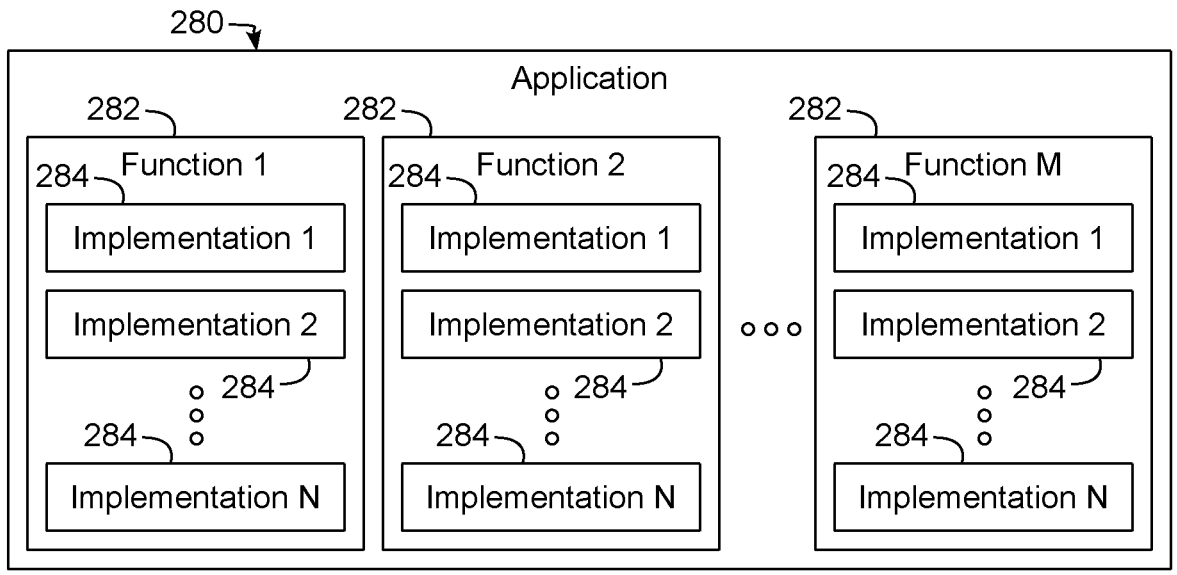
FIG. 6 is a block diagram of an example application incorporating multiple function implementations suitable for use in connection with an incremental garbage collection process consistent with some embodiments of the invention.

Thus, as illustrated in FIG. 6, an example application 280 may include a plurality of functions 282 (Functions 1 ... M), each with two or more implementations 284 (Implementations 1 ... N). It will be appreciated that in some embodiments, each function 282 may include the same number of implementations, while in other embodiments, functions may have different numbers of implementations, and in still other embodiments, some functions may only have one implementation.

Figure 7:
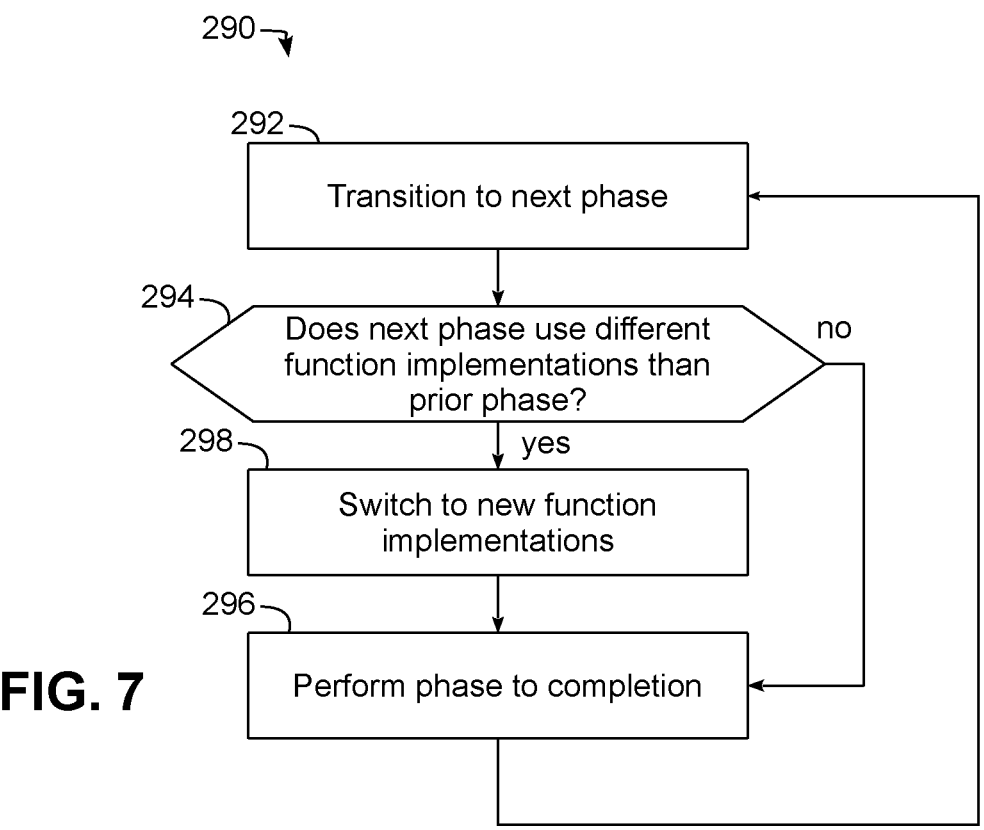
FIG. 7 is a flowchart illustrating an example sequence of operations for performing incremental garbage collection using the example application of FIG. 6.
Figure 8:
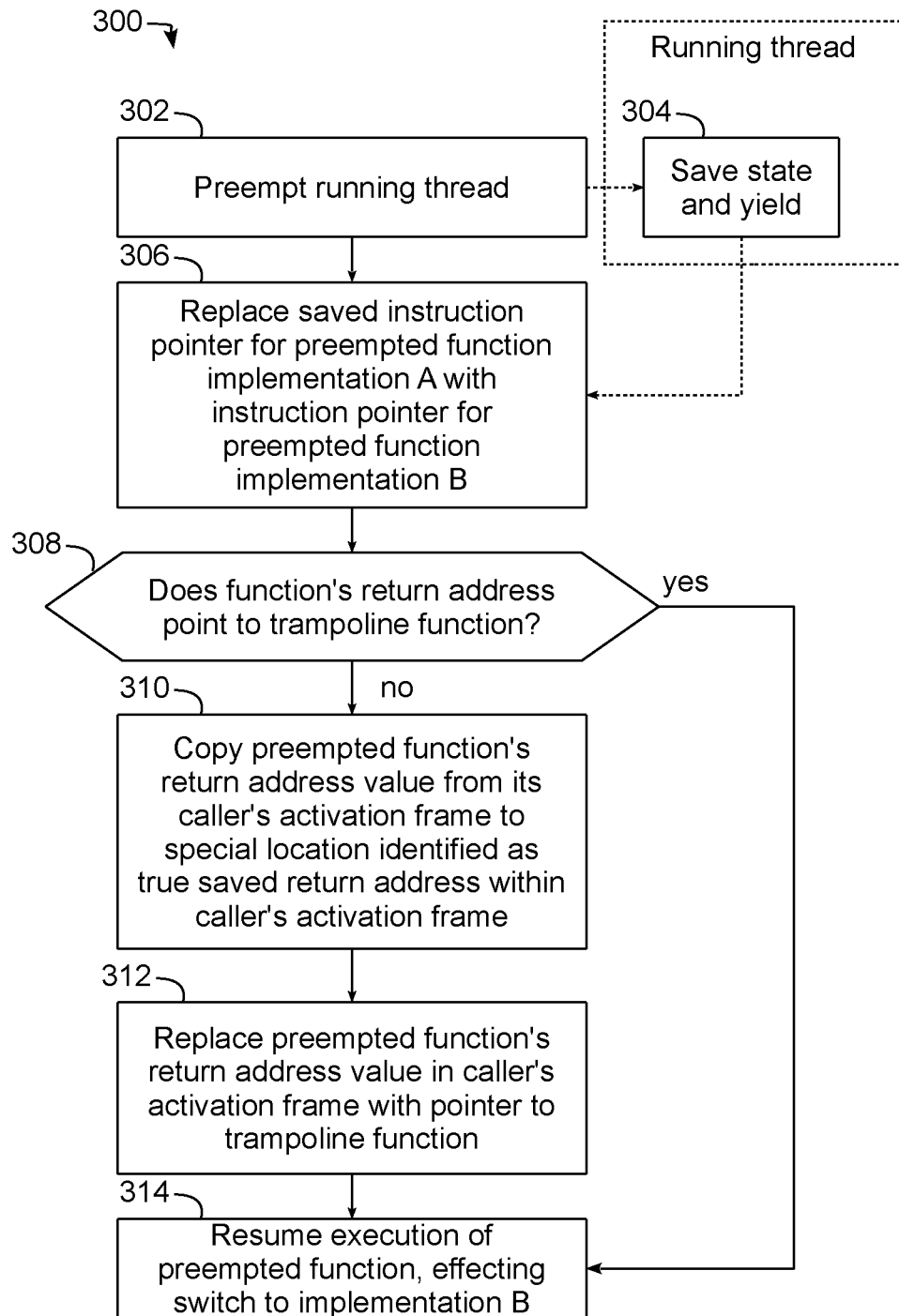
FIG. 8 is a flowchart illustrating an example sequence of operations for switching a function from a first implementation to a second implementation for use with the sequence of operations of FIG. 7.
Figure 9:
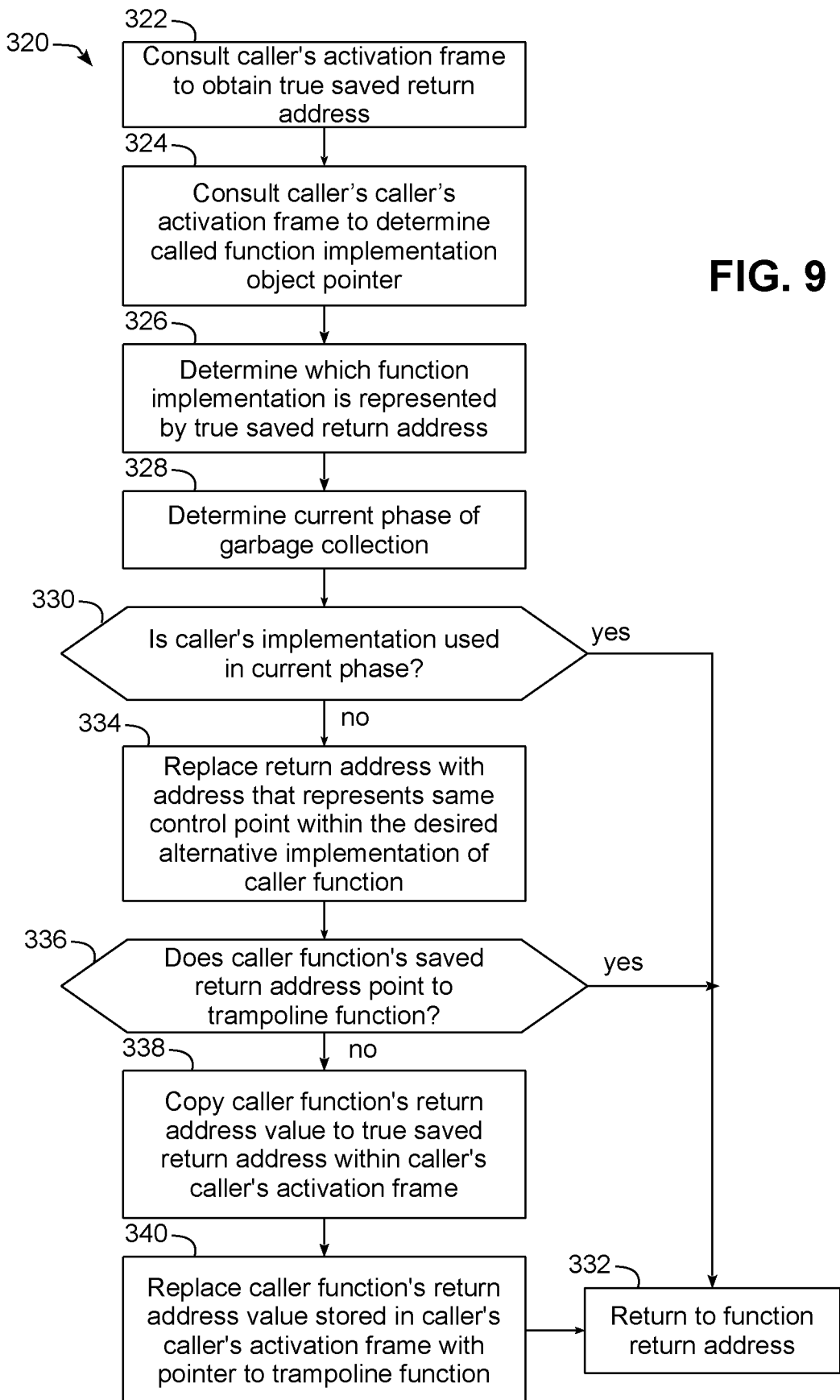
FIG. 9 is a flowchart illustrating an example sequence of operations for the trampoline function referenced in FIG. 8.

FIGS. 7-9 illustrate example routines usable by a managed runtime environment to implement different implementations of a function. FIG. 7, in particular, illustrates an example sequence of operations 290 for transitioning between garbage collection phases for a multi-phase garbage collector (e.g., the various phases illustrated in FIG. 5). In block 292, for example, a transition may occur to a next phase of garbage collection, and in block 294, a determination may be made as to whether the next phase uses different function implementations than the prior phase. If not, control passes to block 296 to perform that phase to completion, and control then returns to block 292 to transition to the next phase. If, however, the next phase uses different function implementations, block 294 passes control to block 298 to switch to new function implementations.

In some embodiments, the switch to new function implementations may be implemented by transitioning a function that is currently being executed by an application thread (or each function that is currently being executed by any application thread in a multi-threaded application) from the implementation used by the prior phase to the implementation used by the next phase. FIG. 8, for example, illustrates an example sequence of operations 300 usable by a managed runtime environment to switch between two different implementations of a function (generically referred to as implementations A and B) for a currently running thread. Sequence of operations 300 may therefore be called whenever garbage collection transitions from a first phase that uses implementation A functions to a second phase that uses implementation B functions.

First, in block 302, the managed runtime environment preempts the current running thread, which, as illustrated by block 304, causes the running thread to save its state and yield control to the managed runtime environment. Once control is yielded to the managed runtime environment, the managed runtime environment modifies the saved state of the running thread by replacing the saved instruction pointer for the preempted function implementation A with the corresponding instruction pointer for the preempted function implementation B (block 306).

Block 308 next determines if the preempted function's return address points to a trampoline function. A trampoline function is used in the illustrated embodiment to fix up a caller function's activation frame to ensure that when a particular implementation of the preempted function completes and is ready to return to the function that originally called that function (the caller function), the return will be to the same implementation of the caller function, even if a different implementation of the caller function made the original call to the preempted function. Thus, if the preempted function's return address does not point to the trampoline function, control passes to block 310 to copy the preempted function's return address value from its caller function's activation frame to a special location identified as a "true" saved return address within the caller function's activation frame. Block 312 then replaces the preempted function's return address value in the caller function's activation frame with a pointer to the trampoline function. Block 314 then resumes execution of the preempted function, thereby effecting a switch to function implementation B. Returning to block 308, if the preempted function's return address already points to the trampoline function, blocks 310 and 312 are skipped, and control passes directly to block 314. The sequence of operations is then complete.

FIG. 9 next illustrates a sequence of operations 320 for an example trampoline function, which is called whenever a function completes its execution and returns to its caller function by way of the return address associated with the function in the caller function's activation frame, and the address of the trampoline function has been stored as the return address using block 312 of FIG. 8. First, in block 322, the caller function's activation frame is consulted to determine the "true" saved return address. Next, in block 324, the caller function's caller function's activation frame (i.e., the activation frame for the function that called the caller function) is consulted to determine the called function implementation object pointer, and in block 326, that object pointer is used to determine which implementation of the caller function is represented by the "true" saved return address. Block 328 then determines a current phase of garbage collection (e.g., by accessing a state variable established by the managed runtime environment, and block 330 determines if the caller function's implementation is used in the current phase.

If the caller function's implementation is used in the current phase, control passes to block 332 to simply return to the "true" saved return address, thereby returning control to the same implementation of the caller function.

If, however, the caller function's implementation is not used in the current phase, block 330 passes control to block 334 to cause control to return to the appropriate alternative implementation of the caller function corresponding to the current phase. Specifically, block 334 replaces the return address with an address that represents the same control point within the desired alternative implementation of the caller function. Block 336 then determines if the caller function's saved return address points to the trampoline function, and if so, passes control to block 332 to return to the return address corresponding to the alternative implementation of the caller function.

If, however, the caller function's saved return address does not point to the trampoline function, block 336 passes control to block 338 to copy the caller function's return address value to the "true" saved return address within the caller function's caller function's activation frame, and block 340 then replaces the caller function's return address value that is stored in the caller function's caller function's activation frame with a pointer to the trampoline function. Control then passes to block 332 to return to the return address corresponding to the alternative implementation of the caller function, and the trampoline function is complete.

It will be appreciated that the trampoline function described herein focuses on the operations performed to switch between function implementations. A trampoline function consistent with the invention may also include additional functionality in other implementations, e.g., to scan the contents of live pointer registers in a caller function's activation frame before returning control to the caller function, or other suitable operations.

To implement multiple function implementations within an application, it may be desirable to utilize a translator to generate multiple function implementations when translating between different representations of an application, e.g., between human-readable representations such as source code, native executable representations such as assembly language code or machine-readable code and/or intermediate representations such as Java bytecode, or when translating between different computing platforms. Translation may therefore include compilation, just-in-time compilation, interpretation, assembling, optimization, etc. in different embodiments. In the illustrated embodiment, for example, and while the invention is not so limited, multiple function implementations may be generated when translating from an intermediate representation such as Java bytecode to a native executable representation such as machine code targeted to a particular computing platform upon which a Java managed runtime environment executes, e.g., using interpretation, compilation or just-in-time compilation, e.g., when classes are loaded by a class loader of the Java managed runtime environment.

In embodiments consistent with the invention, a representation of a program may be generated in connection with translating the program between different representations at least in part by generating multiple implementations of each of a plurality of functions in the program. The multiple implementations may be generated with corresponding behaviors but with one or more of the implementations additionally performing one or more garbage collection-related operations, and with different implementations being configured for execution when a garbage collector is operating in specific sets of one or more garbage collection phases.

Figure 10:
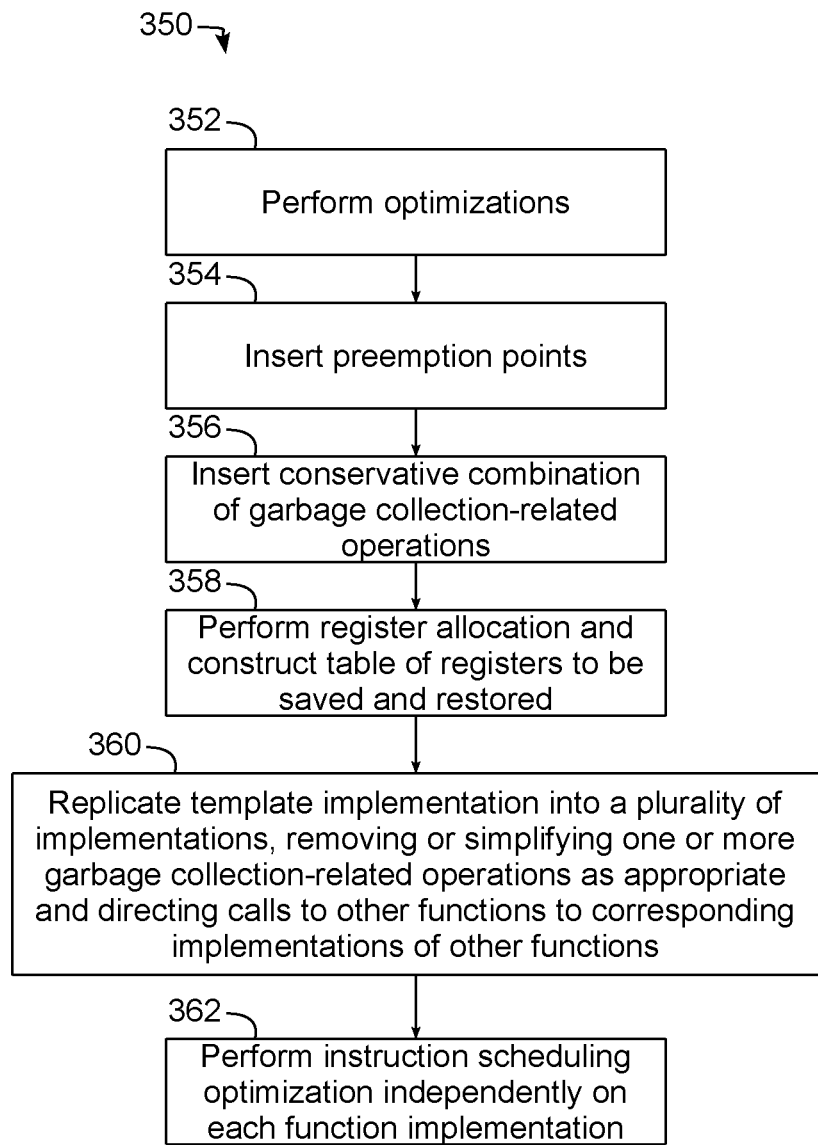
FIG. 10 is a flowchart illustrating an example sequence of operations for generating the example application of FIG. 6.

FIG. 10, for example, illustrates an example sequence of operations 350 for generating multiple implementations of a function of an application, e.g., when translating from an intermediate representation of a program to a native executable representation of the program by a managed runtime environment. Sequence 350, for example, may be executed by a class loader of a managed runtime environment, although the invention is not so limited. First, in block 352, one or more optimizations, e.g., loop unrolling, constant folding, copy propagation, etc. may be performed on the function, in a manner that will be appreciated by those of ordinary skill having the benefit of the instant disclosure. Next, in block 354 one or more preemption points may be inserted into the function, generally with the number of preemption points selected to provide sufficient frequency to assure an upper bound on maximum preemption latency.

Next, in block 356, a "most conservative" combination of garbage collection-related operations is inserted into a template implementation for the function. This "most conservative" combination may include, for example, a union of all of the various garbage collection-related operations needed for all of the phases of a multi-phase garbage collector for the managed runtime environment (e.g., all of the read and write barriers that may be needed by various phases).

Next, in block 358, register allocation may be performed on this template implementation, and a table may be constructed to describe which registers are to be saved and restored at each preemption point. Block 360 then replicates the template implementation into a plurality of implementations, tailoring each replicated function implementation by removing or simplifying one or more garbage collection-related operations as appropriate for the phases with which such implementations are associated. In addition, invocations of other functions from within each tailored function implementation are directed to the tailored function implementations that match the same garbage collection phase(s) as such tailored function implementation, i.e., for a given implementation X of a function A that invokes another function B, the call to function B will be directed to implementation X of function B.

Next, block 362 performs instruction scheduling optimization independently on each tailored function implementation, and sequence 350 is complete for the function.

It will be appreciated that in the illustrated embodiment, all implementations of a function use the same registers for the same purposes, such that if one implementation of a function is preempted and another implementation of the function is resumed, the register values that will be restored from the saved thread state will be meaningful in the new thread context. In other embodiments, however, it may be desirable to enable each implementation to be separately optimized such that different implementations utilize different registers. In such embodiments, however, additional processing may be needed at preemption and resumption to ensure that the thread state is maintained even if the implementation that is preempted differs from that which is resumed.

In addition, while in other embodiments the implementations generated from a template implementation may add functionality, in the illustrated embodiment, functionality is generally removed (if at all) from the template implementation, thereby ensuring that the generated implementations will not need more registers than used by the template implementation.

In addition, it should be noted that instruction scheduling optimizations generally do not span basic blocks, so these optimizations generally do not affect the behavior of the code that saves and restores registers at each preemption point. The "common behavior" at each explicit preemption point is to flow through the code without yielding to the managed run-time environment because preemption requests are relatively rare.

Conclusion

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions and actions specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. The second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of pause-less garbage collection, comprising:
   incrementally performing garbage collection on a memory allocated to an application over a plurality of garbage collection phases and during execution of the application, wherein the application includes a function having first and second implementations thereof, the first and second implementations having corresponding behaviors with the second implementation thereof additionally performing one or more garbage collection-related operations therein, wherein the one or more garbage collection-related operations includes one or more fetches of a non-pointer value from memory, one or more fetches of a pointer value from memory, one or more stores of a non-pointer value to memory, one or more stores of a pointer value to memory, one or more new object allocations, and/or one or more initializations of a field of a newly-allocated object;
   executing the first implementation of the function in response to a first call made to the function during a first set of garbage collection phases from among the plurality of garbage collection phases; and
   executing the second implementation of the function in response to a second call made to the function during a second set of garbage collection phases from among the plurality of garbage collection phases.

2. The method of claim 1, wherein the application includes a plurality of functions, each of the plurality of functions having first and second implementations having corresponding behaviors with the second implementation thereof additionally performing one or more garbage collection-related operations therein, and for each function call made in one function among the plurality of functions to another function among the plurality of functions, the function call in the first implementation of the one function calls the first implementation of the other function, and the function call in the second implementation of the one function calls the second implementation of the other function.

3. The method of claim 1, wherein the one or more garbage collection-related operations further includes one or more read barriers and/or one or more write barriers.

4. The method of claim 1, wherein incrementally performing garbage collection includes:
   garbage collecting within a first region of the memory, wherein the first region of the memory includes a first plurality of objects stored therein, wherein the first plurality of objects includes one or more live objects and one or more reclaimable objects, and wherein garbage collecting within the first region includes, during at least one of the first set of garbage collection phases, incrementally reclaiming the one or more reclaimable objects of the first plurality of objects while retaining the one or more live objects of the first plurality of objects in the first region;
   garbage collecting within a second region of the memory, wherein the second region of the memory includes a second plurality of objects stored therein, wherein the second plurality of objects includes one or more live objects, and wherein garbage collecting within the second region includes, during at least one of the first set of garbage collection phases, incrementally replicating the one or more live objects from the second region as one or more replicated objects within the first region while maintaining application read and write access to the one or more live objects within the second region via application references to the one or more live objects within the second region; and
   after replicating the one or more live objects from the second region and during at least one of the second set of garbage collection phases, overwriting the application references to reference the one or more replicated objects within the first region.

5. A computer program product comprising a computer readable storage medium including program instructions embodied therewith, the program instructions executable by an electronic computer processor to perform pause-less garbage collection using the method of claim 1.

6. A method of generating a program compatible with a pause-less garbage collector that operates in a plurality of garbage collection phases, the method comprising:
   receiving a first representation of a program, the first representation of the program including a plurality of functions; and
   generating a second representation of the program from the first representation of the program, wherein generating the second representation of the program includes generating first and second implementations of each of the plurality of functions, the first and second implementations having corresponding behaviors with the second implementation thereof additionally performing one or more garbage collection-related operations therein, wherein:
      the first implementation of each of the plurality of functions is configured for execution when the pause-less garbage collector is operating in one of a first set of garbage collection phases among the plurality of garbage collection phases;

the second implementation of each of the plurality of functions is configured for execution when the pause-less garbage collector is operating in one of a second set of garbage collection phases among the plurality of garbage collection phases; and the one or more garbage collection-related operations includes one or more fetches of a non-pointer value from memory, one or more fetches of a pointer value from memory, one or more stores of a non-pointer value to memory, one or more stores of a pointer value to memory, one or more new object allocations, and/or one or more initializations of a field of a newly-allocated object.

7. The method of claim 6, wherein the second representation of the program is a native executable representation.

8. The method of claim 7, wherein the first representation of the program is an intermediate representation.

9. The method of claim 8, wherein the first representation of the program is a bytecode representation.

10. The method of claim 6, wherein the first representation of the program is a source code representation and the second representation of the program is one of an intermediate representation or a native executable representation.

11. The method of claim 6, wherein generating the second representation further includes generating a plurality of preemption points in the second representation to facilitate preemption of the program by the pause-less garbage collector.

12. The method of claim 6, wherein the one or more garbage collection-related operations for a first function among the plurality of functions includes a read barrier for a read access performed by the first function.

13. The method of claim 6, wherein generating the first implementation for a first function among the plurality of functions includes directing a function call to a second function among the plurality of functions to the first implementation of the second function, and wherein generating the second implementation for the first function includes directing the function call to the second implementation of the second function.

14. A system comprising a memory and a processor coupled with the memory, the processor configured to generate a program compatible with a pause-less garbage collector that operates in a plurality of garbage collection phases by performing the method of claim 6.

15. A system comprising:
a memory; and
a processor coupled with the memory, the processor configured to perform pause-less garbage collection by:
incrementally performing garbage collection on a memory allocated to an application over a plurality of garbage collection phases and during execution of the application, wherein the application includes a function having first and second implementations thereof, the first and second implementations having corresponding behaviors with the second implementation thereof additionally performing one or more garbage collection-related operations therein, and wherein the one or more garbage collection-related operations includes one or more fetches of a non-pointer value from memory, one or more fetches of a pointer value from memory, one or more stores of a non-pointer value to memory, one or more stores of a pointer value to memory, one or more new object allocations, and/or one or more initializations of a field of a newly-allocated object;

executing the first implementation of the function in response to a first call made to the function during a first set of garbage collection phases from among the plurality of garbage collection phases; and executing the second implementation of the function in response to a second call made to the function during a second set of garbage collection phases from among the plurality of garbage collection phases.

16. The system of claim 15, wherein the application includes a plurality of functions, each of the plurality of functions having first and second implementations having corresponding behaviors with the second implementation thereof additionally performing one or more garbage collection-related operations therein, and for each function call made in one function among the plurality of functions to another function among the plurality of functions, the function call in the first implementation of the one function calls the first implementation of the other function, and the function call in the second implementation of the one function calls the second implementation of the other function.

17. The system of claim 15, wherein the one or more garbage collection-related operations includes one or more read barriers and/or one or more write barriers.

18. The system of claim 15, wherein incrementally performing garbage collection includes:
garbage collecting within a first region of the memory, wherein the first region of the memory includes a first plurality of objects stored therein, wherein the first plurality of objects includes one or more live objects and one or more reclaimable objects, and wherein garbage collecting within the first region includes, during at least one of the first set of garbage collection phases, incrementally reclaiming the one or more reclaimable objects of the first plurality of objects while retaining the one or more live objects of the first plurality of objects in the first region;

garbage collecting within a second region of the memory, wherein the second region of the memory includes a second plurality of objects stored therein, wherein the second plurality of objects includes one or more live objects, and wherein garbage collecting within the second region includes, during at least one of the first set of garbage collection phases, incrementally replicating the one or more live objects from the second region as one or more replicated objects within the first region while maintaining application read and write access to the one or more live objects within the second region via application references to the one or more live objects within the second region; and after replicating the one or more live objects from the second region and during at least one of the second set of garbage collection phases, overwriting the application references to reference the one or more replicated objects within the first region.

* * * * *